United States Patent
Eddy

(10) Patent No.: US 10,906,820 B2
(45) Date of Patent: Feb. 2, 2021

(54) METHOD AND SYSTEM FOR SEPARATION OF SUSPENSIONS

(71) Applicant: 650438 Alberta Ltd., Calgary (CA)

(72) Inventor: Derry Burton Eddy, Calgary (CA)

(73) Assignee: 650438 Alberta Ltd., Calgary (CA)

( * ) Notice: Subject to any disclaimer, the term of this patent is extended or adjusted under 35 U.S.C. 154(b) by 275 days.

(21) Appl. No.: 15/595,263

(22) Filed: May 15, 2017

(65) Prior Publication Data

US 2017/0247264 A1    Aug. 31, 2017

Related U.S. Application Data

(63) Continuation of application No. 14/407,549, filed as application No. PCT/CA2013/050461 on Jun. 14, 2013, now Pat. No. 9,676,638.
(Continued)

(51) Int. Cl.
*C02F 1/38*    (2006.01)
*B04B 1/04*    (2006.01)
(Continued)

(52) U.S. Cl.
CPC ............ *C02F 1/385* (2013.01); *B01D 21/262* (2013.01); *B03B 9/02* (2013.01); *B04B 1/04* (2013.01);
(Continued)

(58) Field of Classification Search
CPC .. C02F 1/385; C02F 1/004; C02F 1/66; C02F 1/68; C02F 1/40; C02F 1/38;
(Continued)

(56) References Cited

U.S. PATENT DOCUMENTS

| | | | |
|---|---|---|---|
| 2,622,794 A | 12/1952 | Smith | |
| 3,260,369 A | 7/1966 | Gruenewaelder | |

(Continued)

FOREIGN PATENT DOCUMENTS

| | | |
|---|---|---|
| CA | 910271 | 9/1972 |
| CA | 1164383 | 3/1984 |

(Continued)

OTHER PUBLICATIONS

The Written Opinion of the International Searching Authority for PCT/CA2013/050461, dated Sep. 11, 2013. (Year: 2013).*
(Continued)

*Primary Examiner* — Claire A Norris
(74) *Attorney, Agent, or Firm* — Andrus Intellectual Property Law, LLP

(57) ABSTRACT

A method and system for separating a suspension into solid and fluid components. The suspension is centrifuged about a substantially vertical axis of rotation to concentrate solid components in a first lower flow stream and fluid components in a first upper flow stream. The first upper flow stream may be centrifuged about a substantially vertical axis of rotation to concentrate solid components in a second lower flow stream and fluid components in a second upper flow stream. The first lower flow stream, the second lower flow stream, or both, may be centrifuged about a substantially horizontal axis of rotation to separate water from stackable dry tailings. The method and system may be applied to separation of tailings or other suspensions.

25 Claims, 17 Drawing Sheets

Related U.S. Application Data

(60) Provisional application No. 61/660,058, filed on Jun. 15, 2012.

(51) Int. Cl.

| | | |
|---|---|---|
| *B04B 1/20* | (2006.01) | |
| *B04B 9/00* | (2006.01) | |
| *B04B 9/08* | (2006.01) | |
| *B04B 9/12* | (2006.01) | |
| *B04B 5/10* | (2006.01) | |
| *B04B 7/12* | (2006.01) | |
| *C10G 1/04* | (2006.01) | |
| *B03B 9/02* | (2006.01) | |
| *B01D 21/26* | (2006.01) | |
| *C02F 1/00* | (2006.01) | |
| *C02F 1/68* | (2006.01) | |
| *E03F 5/16* | (2006.01) | |
| *C02F 1/66* | (2006.01) | |
| *C02F 103/36* | (2006.01) | |
| *C02F 1/40* | (2006.01) | |
| *E03F 5/14* | (2006.01) | |

(52) U.S. Cl.
CPC ............... *B04B 1/20* (2013.01); *B04B 5/10* (2013.01); *B04B 7/12* (2013.01); *B04B 9/00* (2013.01); *B04B 9/08* (2013.01); *B04B 9/12* (2013.01); *C02F 1/004* (2013.01); *C02F 1/66* (2013.01); *C02F 1/68* (2013.01); *C10G 1/045* (2013.01); *E03F 5/16* (2013.01); *B01D 21/26* (2013.01); *B01D 2221/04* (2013.01); *B04B 1/2016* (2013.01); *B04B 2001/2041* (2013.01); *B04B 2001/2058* (2013.01); *C02F 1/38* (2013.01); *C02F 1/40* (2013.01); *C02F 2103/365* (2013.01); *E03F 5/14* (2013.01)

(58) Field of Classification Search
CPC . C02F 2103/365; B01D 21/262; B01D 21/26; B01D 2221/04; B04B 5/10; B04B 7/12; B04B 1/04; B04B 9/00; B04B 1/20; B04B 9/08; B04B 9/12; B04B 1/2016; B04B 2001/2058; B04B 2001/2041; B03B 9/02; C10G 1/045; E03F 5/16; E03F 5/14

See application file for complete search history.

(56) References Cited

U.S. PATENT DOCUMENTS

| | | | |
|---|---|---|---|
| 3,605,975 A | | 9/1971 | Brimhall |
| 3,971,509 A | | 7/1976 | Johnsen et al. |
| 4,139,450 A | | 2/1979 | Hanson et al. |
| 4,409,091 A | | 10/1983 | Kessick |
| 4,826,608 A | * | 5/1989 | Kopper ............... B04B 1/20 210/374 |
| 4,871,449 A | | 10/1989 | Lott |
| 4,891,041 A | | 1/1990 | Hohmann et al. |
| 4,915,681 A | | 4/1990 | Suzuki |
| 5,338,285 A | | 8/1994 | Omori |
| 5,462,513 A | | 10/1995 | McAlister |
| 5,492,628 A | | 2/1996 | Schutte |
| 5,728,039 A | | 3/1998 | Knelson |
| 5,770,049 A | | 6/1998 | Humphreys |
| 5,792,039 A | * | 8/1998 | Green ............... B04B 1/20 494/53 |
| 5,804,077 A | | 9/1998 | Smith et al. |
| 5,971,907 A | | 10/1999 | Johannemann et al. |
| 6,004,255 A | * | 12/1999 | Madsen ............... B04B 1/20 494/54 |
| 2008/0035531 A1 | | 2/2008 | Coveley |
| 2009/0206040 A1 | | 8/2009 | Berg et al. |
| 2010/0104744 A1 | | 4/2010 | Moffett |
| 2010/0147516 A1 | | 6/2010 | Betzer-Zilevitch |
| 2010/0240513 A1 | | 9/2010 | McAlister et al. |
| 2011/0186500 A1 | | 8/2011 | Czwaluk et al. |
| 2011/0266198 A1 | | 11/2011 | Hassan et al. |
| 2012/0248042 A1 | | 10/2012 | Baldrey |

FOREIGN PATENT DOCUMENTS

| | | |
|---|---|---|
| CA | 2188064 | 4/1998 |
| CA | 2666025 | 11/2010 |
| EP | 0933113 A1 | 8/1999 |
| JP | 55044373 A | 3/1980 |
| WO | 2008064905 | 6/2008 |

OTHER PUBLICATIONS

The International Preliminary Report on Patentability (Chapter II) for PCT/CA2013/050461, dated Sep. 19, 2014. (Year: 2014).*
Mercier, P.H.J. et al., "Colloidal Clay Gelation: Relevance to Current Oil Sands Operations", Petroleum Science and Technology, 30:9, 915-923, Jan. 2012.
Hangx, S., "Subsurface mineralisation, Rate of CO2 mineralisation and geomechanical effects on host and seal formations", CATO, Mar. 2005.
International Search Report for PCT/CA2013/050461 dated Sep. 13, 2013.
Juma, N., "Definitions of Clay Crystals", The Pedosphere and its Dynamics; Mineralogy, 6.3 Clay Crystals, 1998.
Majid, A. et al., "Centrifuge Tailings from Oil Sands Plants—A Resource Material for Titanium and Zirconium", National Research Council, 1998.
Mercier, P. et al., "Powder x-ray diffraction of phyllosilcate mass and area versus particle thickness distributions for clays from the Athabasca oil sands", National Research Council, 2008.
Michot, L. et al., "Liquid-crystalline aqueous clay suspensions", PNAS, Oct. 31, 2006.
Mikula et al., "Centrifugation Options for Production of Dry Stackable Tailings in Surface-Mined Oil Sands Tailings Management" Journal of Canadian Petroleum Technology, vol. 48, No. 9, Sep. 19, 2009.
OSTRF Conference Presentation (Syncrude Canada Ltd.),"New Tailings Concepts", Dec. 7, 2008, pp. 3-6.
Response to Written Opinion for PCT/CA2013/050461 dated Apr. 15, 2014.
Shainberg, I. et al., "Electrical Conductivity of Na/Ca Montmorillonite Gels", The Clay Minerals Society, 1982.
U.S. Appl. No. 15/595,205, Notice of Allowance dated Jun. 4, 2019.

* cited by examiner

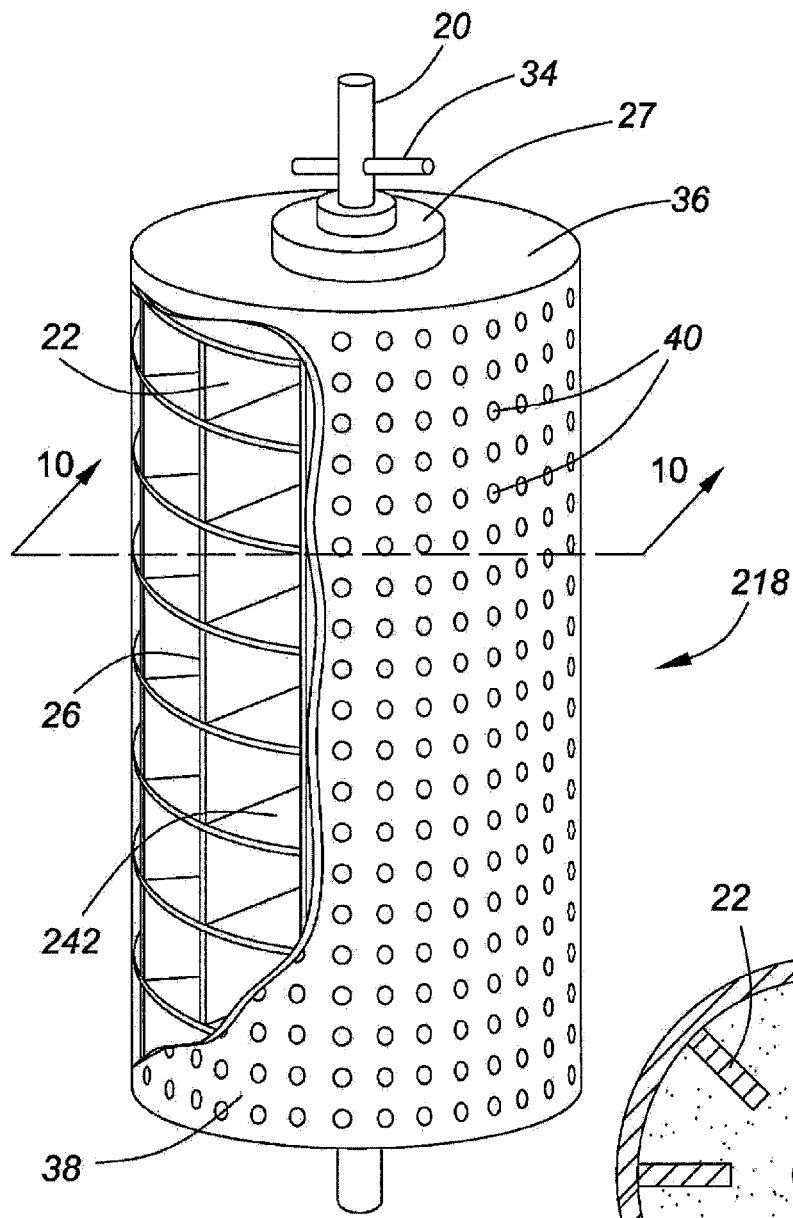
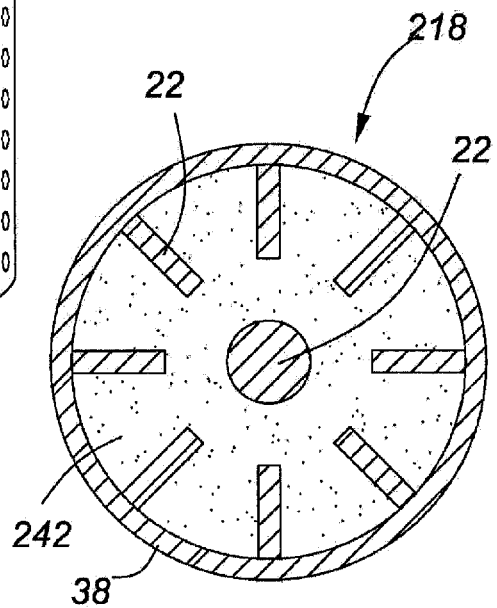
FIG. 9
FIG. 10

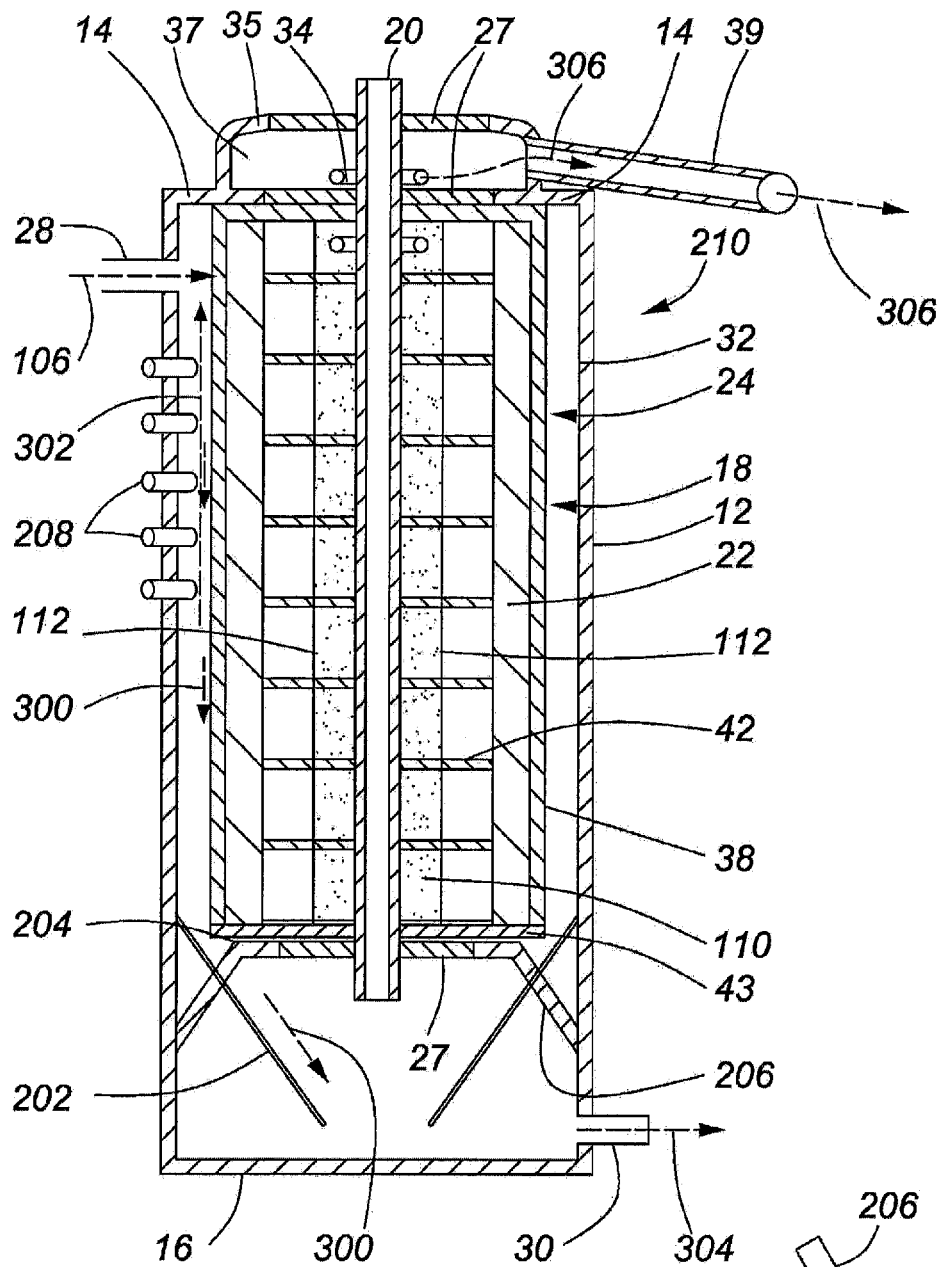
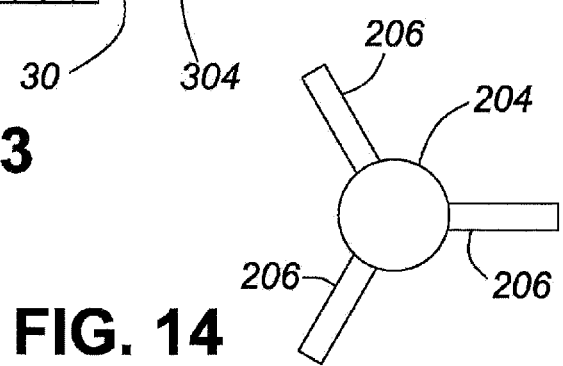
FIG. 13
FIG. 14

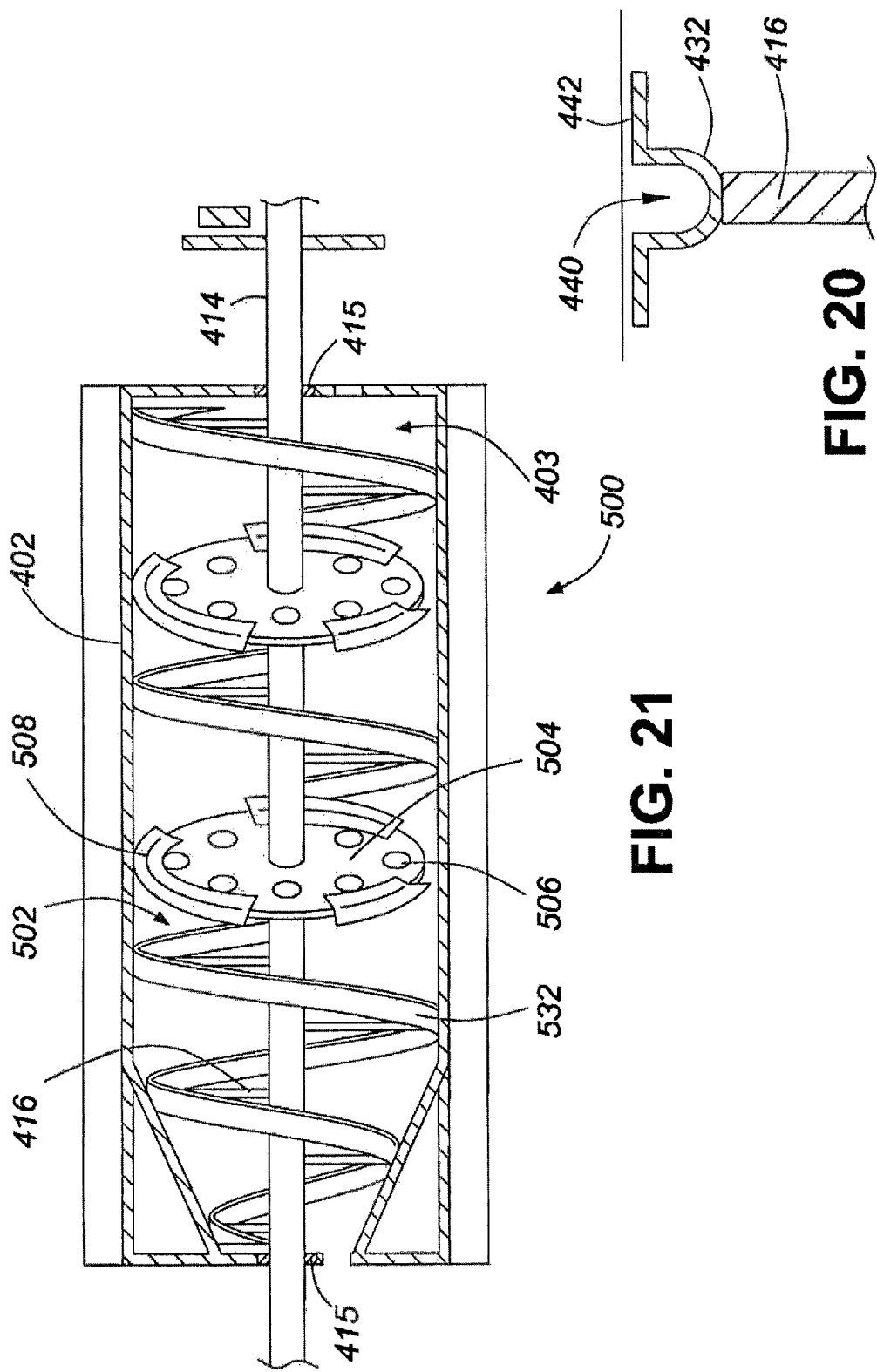

METHOD AND SYSTEM FOR SEPARATION OF SUSPENSIONS

CROSS REFERENCE TO RELATED APPLICATIONS

This application is a continuation application of U.S. patent application Ser. No. 14/407,549, filed Dec. 12, 2014, which '549 application is the U.S. national stage application of International Patent Application No. PCT/CA2013/050461, filed Jun. 14, 2013, which international application was published on Dec. 9, 2013, as International Publication WO2013/185243 in the English language. The international application claims priority to U.S. Provisional Patent Application No. 61/660,058, filed Jun. 15, 2012. All of the above are hereby incorporated herein by reference in entirety.

FIELD

The present disclosure relates generally to treatment of a suspension of solids in a liquid. More particularly, the present disclosure relates to separation of tailings or other wastewater suspensions into solid and fluid components.

BACKGROUND

Mineable oil sands ore comprise bitumen, water, sand, fine clays, and silt. The bitumen may be separated from the remaining components of the oil sands using a hot water extraction process. In the hot water process, ore is mixed with hot water, and the oil floats to the top of the mixture. The water, sand, and silt are present below the oil. A caustic solution may be added to facilitate separation of bitumen from the sand. The oil is removed from the top of the mixture. The water, including clays and other fines from the ore which remain suspended in the water, is removed from the bottom of the mixture along with some remaining bitumen, and transported to settling ponds. Horizontal separators may have application in separating water from clay and other fines. An example of a horizontal separator is found in U.S. Pat. No. 2,622,794, issued Dec. 23, 1952 to Smith.

Fines in suspension settle to about 30 to 40% solid (w/w), at which point they form a gel-like material (a "colloidal suspension"; see below). The colloidal suspension includes large amounts of water and slows further settling from the water. In terms of weight, the smallest fines may represent about 3% of the mature fine tailings ("MFT"), but may entrap coarser solids such that the colloidal suspension forming from MFT may contain 30% by weight solids.

Water in the MFT cannot immediately be used again in the hot water extraction process, requiring that additional water be introduced into the system to continue the hot water process. MFT eventually settle in the ponds producing water that can be reused, but the residence time in the ponds can be years, requiring very large settling ponds which present a hazard to migrating water fowl and are a potential source of groundwater contamination (Mercier et al., 2008).

Clays

Clays are sheet-like phyllosilicate crystalline minerals with a layered structure of shared octahedral and tetrahedral sheets. Illite, kaolinite, and montmorillonite are three types of clays found in oil sands. Substitution of cations within the structure of these clays produces a variety of species of clays (Juma, 1998; Mercier et al., 2008)

Bulk deposits of clay are often present in the oil sands deposits. While bulk deposits of clay are largely avoided in the mining operations, clay is distributed in the ore and is therefore present in the hot water process. Fine clay particles interfere with the hot water process and the presence of fines in process water is undesirable. Particles of clays have negatively charged surfaces and sheet faces, and positive charges on the edge surfaces. Since the surface area of the sheet face is much larger than the surface area of the edge face, the negative charges dominate interactions between particles. Cations, including $H_3O^+$, may facilitate binding between sheets of clay. Clays may be non-swelling, for example kaolinite and illite clays, or swelling, for example montmorillonite clays.

Colloidal Suspension

When clays are introduced into the hot water process, they become defoliated and create the fines found in tailings. The charged surfaces of the fines form hydrogen bonds with water molecules. Fines in solution are a colloidal suspension. As the fines settle, they reach a point where steric forces impede further settling. When this point is reached, the suspension has the consistency of a gel and is called a "floc". Colloidal suspensions may be described in terms of Gibbs free energy:

$$\Delta G = \Delta H - T\Delta S \qquad [\text{Eq. 1}]$$

In Eq. 1, $\Delta G$ is the change in Gibbs free energy, $\Delta H$ is the change in enthalpy, $\Delta S$ is the change in entropy, and T is the temperature, of the system. While systems seek a global minimum in G, a system may remain in a local minimum absent sufficient activation energy ("$E_a$") to exceed the local minimum G and reach the lower global minimum. A floc is at a local minimum and will eventually settle out into clays which represent a global minimum free energy state. Colloidal suspensions are very stable and can last for years.

Bringing defoliated sheets of clay together again is analogous to adsorption of a molecule on a surface of another substance. At distance, the adsorbing molecule may not be attracted by the surface, and may actually be repelled. However, in close proximity, attractive Van der Waal forces may cause adsorption onto the surface. Similarly, the negatively-charged surfaces of clay sheets introduce steric repulsive forces when the fines particles are at distance, stabilizing the local minimum of the colloidal suspension. However, at close distances, the Van der Waal forces may become large enough to bring the sheets together. High ionic strength solutions tend to stabilize the settled clay and promote the settling of the floc state into the clay state.

The stability of the colloidal suspensions (and the $\Delta G$ value associated with its refoliation) is dependent on the $\Delta H$ of hydration of the clay sheets, the $\Delta H$ of refoliation into clays, and the $\Delta S$ of the system. Since the clays settle eventually, the $\Delta H$ of refoliation is sufficiently negative to overcome the negative $\Delta S$ of the transition from colloidal suspension to clay the $\Delta H$ of hydration. To move the equilibrium towards formation of ordered sheets (i.e. foliation), energy must be introduced to overcome the $E_a$ of the transition. However, introduction of too much energy may move the colloidal suspension into an even higher free energy state, which is undesirable.

Fines are negatively charged and their surface area may be upwards of 100 $m^2/g$, resulting in a high net negative charge of a suspension of fines. Following use in the hot water process, water includes $OH^-$. The dissolved $OH^-$ contributes to charge interactions and interferes with the settling of colloidal suspensions into clays. Each clay sheet in the colloidal suspension interacts with water through hydrogen and Van der Waal bonds, dissipating surface charge energy. The energy of hydration of the colloidal suspension may, along with the steric forces, contribute to the activation energies to be overcome in refoliation.

Kaolinite may have a lower $E_a$ to reform into clay than illite. Increasing the availability of cations to the clay formation may contribute to overcoming the $E_a$ required to settle the colloidal suspensions. The availability of cations may be increased by acidifying the solution. At lower pH values, cations other than $H_3O^+$ are less likely to remain coordinated to $OH^-$ in solution and would be available for binding to negatively charged surfaces particles of fines. Further, the presence of $H_3O^+$ may decrease the amount of water surrounding fines, allowing particles of fines to settle closer together (a hydration layer does not need to be as thick to dissipate the negativity charge surfaces with the positive charge on the hydronium ions). This change in environment may reduce the $E_a$ enough for the spontaneous settling of the colloidal suspension. If not, sufficient energy can be added to the system to overcome the remaining $E_a$, allowing settling to occur spontaneously into the lower free energy state. However, fines in general, and particularly fines that have formed a colloidal suspension, do not settle out of solution easily.

SUMMARY

It is an object of the present disclosure to obviate or mitigate at least one disadvantage of previous tailings treatment processes.

The method includes separation of fines from tailings in a centrifuge having a substantially vertical axis of rotation, as described below in this summary, resulting in an upper flow stream and a lower flow stream. In some embodiments, the tailings may be acidified, a second centrifuge having a substantially horizontal axis of rotation (as described below in this summary) may be applied to separate suspended particles from water in the lower flow stream, a third centrifuge having a substantially vertical axis of rotation may be employed in a step intermediate the other two centrifuges to treat the upper flow stream with the upper flow stream being alkalinized prior to being provided to the third centrifuge to facilitate formation of ooids from suspended particles (the ooids separate more easily from the suspension than fines), or a combination of these features may be provided.

A first centrifuge for use in the method includes an inner assembly within a body. The inner assembly is separated from an inner surface of the body by a space and the interior of the inner assembly is isolated from the space. The inner assembly includes paddles and a baffle attached to a drive shaft. The drive shaft is rotatable about a substantially vertical axis to rotate the inner assembly. During rotation of the inner assembly, centripetal forces force particles to remain in the space, as opposed to moving through the baffle into the inner assembly. In addition, frictional forces between the inner assembly and the fluid suspension in the discharge space causes the fluids to rotate with lower velocity and further urges the particles against the inner wall of the body (i.e. within the discharge space and not into the inner assembly, similarly in principle to a cyclone separator). In the space, the concentrated particles will settle out to the bottom of the body for removal as a lower flow stream. Fluid components of a suspension being centrifuged within the body may flow into the inner assembly through the baffle. Flowing through the baffle dampens turbulent flow into laminar unidirectional flow. The paddles keep the fluid moving at the same angular velocity throughout the interior of the inner assembly. The fluid can be recovered as an upper flow stream from within the inner assembly. Thus, by application of centripetal force and of gravity, most of the particles in suspension are sequestered in the space while fluid with a small amount of particles (e.g. the smallest particles) flows into the inner assembly. Feed can be continually introduced into the discharge space and mixed with the rotating suspension by the turbulent flow in the discharge space. The upper and lower flow streams may similarly be removed in a continuous process.

A second centrifuge for use in the method includes a body extending along a substantially horizontal axis. A drive shaft extends through the body and is connected to a rake which is positioned proximate an inner surface of the body. The body is rotatable independently of the drive shaft. When the drive shaft is rotated at a differential speed relative to the body, the rake moves settled solids towards a solids outlet, while fluid separated from the solids flow towards a fluid outlet. The rake is centralized within the body during rotation by fluid dynamics. As with the first centrifuge, feed can be added to, and fluids and solids recovered from, the second centrifuge in a continuous process.

In a first aspect, the present disclosure provides a method and system for separating a suspension into solid and fluid components. The suspension is centrifuged about a substantially vertical axis of rotation to concentrate solid components in a first lower flow stream and fluid components in a first upper flow stream. The first upper flow stream may be centrifuged about a substantially vertical axis of rotation to concentrate solid components in a second lower flow stream and fluid components in a second upper flow stream. The first lower flow stream, the second lower flow stream, or both, may be centrifuged about a substantially horizontal axis of rotation to separate water from stackable dry tailings. The method and system may be applied to separation of tailings or other suspensions.

In a further aspect, the present disclosure provides a method of separating fines from tailings including providing tailings; and centrifuging the tailings about a substantially vertical axis of rotation to separate the tailings into a first upper flow stream comprising water and ultrafines, and a first lower flow stream comprising water and fines.

In an embodiment, the method include separating the first lower flow stream into water and stackable product. In an embodiment, separating the first lower flow stream into water and stackable product includes centrifuging the first lower flow stream about a substantially horizontal axis of rotation. In an embodiment, centrifuging the first lower flow stream is with a centripetal force of between 70 G and 170 G at a maximum centrifugal radius. In an embodiment, centrifuging the first lower flow stream is with a centripetal force of about 120 G at a maximum centrifugal radius.

In an embodiment, centrifuging the tailings is with a centripetal force of between 100 G and 700 G at a maximum centrifugal radius. In an embodiment, centrifuging the tailings is with a centripetal force of about 400 G at a maximum centrifugal radius.

In an embodiment, the method includes acidifying the tailings prior to centrifuging. In an embodiment, acidifying the tailings is with CO2. In an embodiment, the CO2 is at a pressure of between 7 and 13 MPa. In an embodiment, the CO2 is at a pressure of about 10 MPa. In an embodiment, the CO2 is at a pressure of between 2 and 8 MPa. In an embodiment, the CO2 is at a pressure of about 5 MPa. In an embodiment, centrifuging the tailings is in the presence of saturating concentrations of CO2¬.

In an embodiment, the method includes acidifying the tailings prior to centrifuging. In an embodiment, acidifying the tailings is with CO2. In an embodiment, the method further includes degassing the first upper flow stream to produce CO2 offgas. In an embodiment, the degassing is at a pressure of between 2 and 8 MPa. In an embodiment, the degassing is at a pressure of about 5 MPa. In an embodiment, method further includes recovering and sequestering the CO2 offgas.

In an embodiment, the method includes acidifying the tailings prior to centrifuging. In an embodiment, acidifying the tailings is with CO2. In an embodiment, the method includes centrifuging the first upper flow stream about a substantially vertical axis of rotation to separate the first upper flow stream into a second upper flow stream comprising water and a second lower flow stream comprising water and aggregated ultrafines. In an embodiment, the method includes alkalinizing the first upper flow stream. In an embodiment, the first upper flow stream is alkalinized with Ca(OH)2 and OH—. In an embodiment, the method includes adding a material to facilitate nucleation of the fines and formation of ooids. In an embodiment, the material includes clay, quartz, carbonate, or a combination thereof.

In an embodiment, the method includes acidifying the tailings prior to centrifuging. In an embodiment, acidifying the tailings is with CO2. In an embodiment, the method includes centrifuging the first upper flow stream about a substantially vertical axis of rotation to separate the first upper flow stream into a second upper flow stream comprising water and a second lower flow stream comprising water and aggregated ultrafines. In an embodiment, the method includes degassing the second upper flow stream to produce CO2 offgas. In an embodiment, the method includes recovering and sequestering the CO2 offgas.'

In an embodiment, the method includes acidifying the tailings prior to centrifuging. In an embodiment, acidifying the tailings is with CO2. In an embodiment, the method includes centrifuging the first upper flow stream about a substantially vertical axis of rotation to separate the first upper flow stream into a second upper flow stream comprising water and a second lower flow stream comprising water and aggregated ultrafines. In an embodiment, the method includes combining the first lower flow stream with the second lower flow stream into a combined lower flow stream, and separating the combined lower flow stream into water and stackable product. In an embodiment, separating the combined lower flow stream into water and stackable product comprises centrifuging the combined lower flow stream about a substantially horizontal axis of rotation. In an embodiment, providing the tailings, centrifuging the tailings, centrifuging the first upper flow stream, and centrifuging the combined lower flow stream about a substantially horizontal axis of rotation are performed as a continuous process.

In an embodiment, the tailings comprise TFT, MFT, or both. In an embodiment, the tailings comprise up to about 50% (w/w) solids. In an embodiment, the tailings comprise 30% to 35% (w/w) solids. In an embodiment, the tailings comprise about 8% (w/w) solids.

In a further aspect, the present disclosure provides a centrifuge for separating a suspension into an upper flow stream and a lower flow stream. The centrifuge includes an elongate body extending along a substantially vertical longitudinal axis between a bottom end and a top end; a drive shaft extending through the body along the longitudinal axis and rotatable about the longitudinal axis independently of the body; two or more paddles connected to the drive shaft for agitating the suspension during rotation of the drive shaft, an outer edge of each of the paddles separated from an inner surface of the body to define a space; a baffle connected to the drive shaft, the baffle disposed between the drive shaft and the inner surface of the body for dampening turbulence in the suspension during centrifugation; an inlet for receiving the suspension into the body; a lower flow stream outlet for discharging the lower flow stream proximate the bottom end; and an upper flow stream outlet for discharging the upper flow stream proximate the top end.

In an embodiment, the baffle is positioned between the outer edges of the paddles and the inner surface of the body. In an embodiment, the baffle is a shroud enclosing the paddles and separated from the inner surface of the body to define the space, the shroud having a plurality of apertures for allowing fluid to pass through the shroud. In an embodiment, the shroud is connected to paddles at the outer edges of the paddles. In an embodiment, the apertures are hexagonal in cross section.

In an embodiment, the paddles are connected to the drive shaft by connectors and separated from the drive shaft along a portion of the length of each paddle along the longitudinal axis.

In an embodiment, the paddles are connected to the drive shaft by a plurality of connector plates between the paddles for compartmentalizing spaces between the paddles and the connector plates.

In an embodiment, the inlet is located proximate the top end.

In an embodiment, the inlet is located on the top end.

In an embodiment, the lower flow stream outlet is located on the bottom end.

In an embodiment, the upper flow stream outlet is located on the top end.

In an embodiment, the centrifuge includes an upper flow stream passage within the drive shaft, and wherein the upper flow stream outlet is in fluid communication with the upper flow stream passage. In an embodiment, the centrifuge includes a second body extending from the top end, the second body defining an upper flow stream discharge space within the second body, and wherein the upper flow stream outlet is in fluid communication with the upper flow stream discharge space.

In an embodiment, the centrifuge includes a pump for introducing gas into the body.

In an embodiment, the centrifuge includes a pressure relief valve on the body for relieving pressure within the body.

In an embodiment, the centrifuge includes a cyclone separator below the body for collecting the lower flow stream.

In an embodiment, the centrifuge includes an additive inlet in the body for administering fluids or solids other than the suspension into the body.

In a further aspect, the present disclosure provides a centrifuge for separating a suspension into a fluid component and a solids component. The centrifuge includes an elongate body extending along a substantially horizontal longitudinal axis between a fluid discharge end and a solids discharge end, the body rotatable about the longitudinal axis; a separation zone defined within the body, the separation zone having a greater cross-sectional area at the solids discharge end than at the fluid discharge end; a rotation driver for rotating the body about the longitudinal axis; a drive shaft extending through the body and rotatable about the longitudinal axis independently of the body; a rake connected to the drive shaft and positioned proximate an inner surface of the body; a first inlet for receiving the suspension into the separation zone; a fluid discharge outlet for discharging fluid proximate the fluid discharge; and a solids discharge outlet for discharging solids proximate the solids discharge end. Rotation of the body with the suspension in the separation zone causes rotation of the rake and drive shaft. Differential rotation of the rake relative to the body directs solids to the solid discharge end.

In an embodiment, the rake is helical and extends along substantially the entire length of the body along the longitudinal axis.

In an embodiment, the centrifuge includes a brake for slowing rotation of the drive shaft independently of the body to provide differential rotation of the rake and the body.

In an embodiment, the first feed inlet is located within the drive shaft. In an embodiment, the centrifuge includes a second feed inlet within the drive shaft for delivering fluid to the separation zone, the first and second feed inlets delivering feed at different longitudinal locations along the separation zone.

In an embodiment, the centrifuge includes a support plate mounted on the drive shaft for supporting the body, the support plate including a plurality of apertures for allowing fluid to pass through the support plate.

In an embodiment, the rake defines a cavity on an outer surface of the rake facing the inner for pooling of the suspension during rotation of the drive shaft. In an embodiment, the centrifuge includes flanges extending laterally from the ski on each side of the cavity to facilitate rotation of the rake and the drive shaft by rotation of the body with the suspension in the separation zone and to facilitate hydroplaning over the inner surface of the body during differential rotation.

In an embodiment, the rotation driver comprises a support wheel positioned about an outer surface of the body for supporting the body during rotation of the body and a drive wheel positioned about the outer surface for driving rotation of the body about the longitudinal axis.

In an embodiment, the fluid discharge outlet is on the fluid discharge end.

In an embodiment, the solids discharge outlet is on the solids discharge end.

In a further aspect, the present disclosure provides a system for separating fines from tailings comprising a first centrifuge as summarized above (substantially vertical axis of rotation) and a second centrifuge as summarized above (substantially horizontal axis of rotation).

In an embodiment, the system includes a third centrifuge for separating a suspension into an upper flow stream and a lower flow stream. The third centrifuge includes an elongate body extending along a substantially vertical longitudinal axis between a bottom end and a top end; a drive shaft extending through the body along the longitudinal axis and rotatable about the longitudinal axis independently of the body; two or more paddles connected to the drive shaft for agitating the suspension during rotation of the drive shaft, an outer edge of each of the paddles separated from an inner surface of the body to define a space; a baffle connected to the drive shaft, the baffle disposed between the drive shaft and the inner surface of the body for dampening turbulence in the suspension during centrifugation; an inlet for receiving the suspension into the body; a lower flow stream outlet for discharging the lower flow stream proximate the bottom end; an upper flow stream outlet for discharging the upper flow stream proximate the top end; and a cyclone separator below the body for collecting the lower flow stream. The second centrifuge includes an elongate body extending along a substantially horizontal longitudinal axis between a fluid discharge end and a solids discharge end, the body rotatable about the longitudinal axis; a separation zone defined within the body, the separation zone having a greater cross-sectional area at the solids discharge end than at the fluid discharge end; a rotation driver for rotating the body about the longitudinal axis; a drive shaft extending through the body and rotatable about the longitudinal axis independently of the body; a rake connected to the drive shaft and positioned proximate an inner surface of the body; a first inlet located within the drive shaft for receiving the suspension into the separation zone; a fluid discharge outlet for discharging fluid proximate the fluid discharge; a solids discharge outlet for discharging solids proximate the solids discharge end; and a second feed inlet within the drive shaft for delivering fluid to the separation zone, the first and second feed inlets delivering feed at different longitudinal locations along the separation zone. Rotation of the body with the suspension in the separation zone causes rotation of the rake and drive shaft. Differential rotation of the rake relative to the body directs solids to the solid discharge end. In an embodiment, the upper flow stream outlet of the first centrifuge is in fluid communication with the inlet of the third centrifuge, the lower flow stream outlet of the first centrifuge is in fluid communication with the first inlet of the second centrifuge, and the lower flow stream outlet of the third centrifuge is in fluid communication with the second inlet of the second centrifuge.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached figures.

FIG. 9 is a partial cutaway perspective view of an alternative inner assembly for the centrifuge of FIG. 3;

FIG. 10 is a cross-sectional plan view of the alternative inner assembly of FIG. 9 along the plane 10-10;

FIG. 13 is a cross-sectional elevation view of an alternative centrifuge with a substantially vertical axis of rotation in operation along a plane corresponding to 5-5 of FIG. 3;

FIG. 14 is a plan view of a base of the centrifuge of FIG. 13;

FIG. 20 is a cross-sectional elevation view of an embodiment of a rake of the centrifuge of claim 15;

FIG. 21 is a cross-sectional elevation view of an alternative centrifuge with a substantially horizontal axis of rotation along a plane analogous to the plane 17-17 of FIG. 15 showing a rake assembly and drive shaft without cross section;

DETAILED DESCRIPTION

Figure 1:
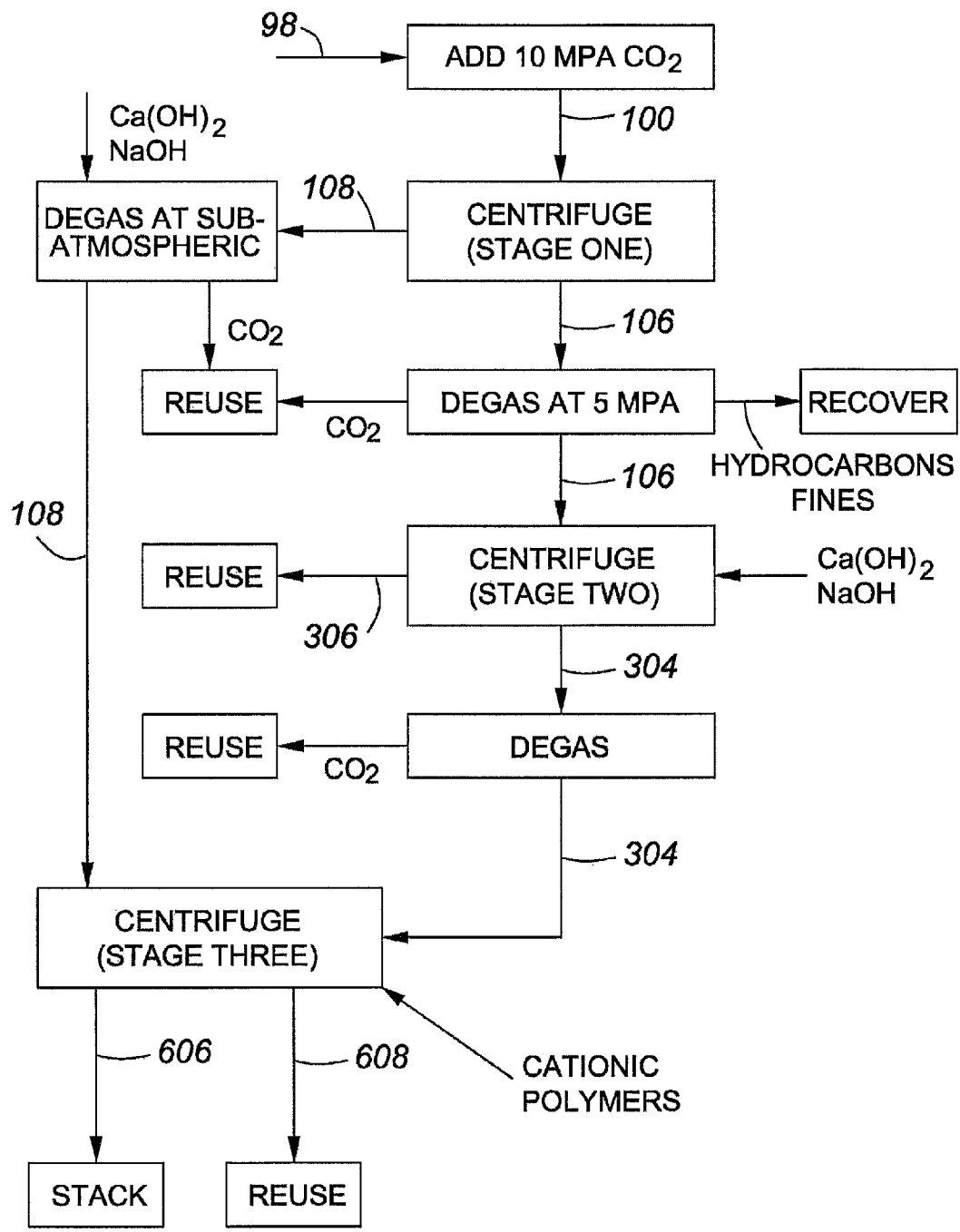
FIG. 1 is a schematic of a process for separating fines from tailings.

It is desirable to provide an apparatus and process for separating solid components from fluid components of tailings. Generally, the present disclosure relates to a process and system for separating a suspension of fines into solid and fluid components (the suspension exemplified as tailings). The process includes, and the system facilitates, centrifuging the suspension about a substantially vertical axis of rotation to concentrate solid components in a first lower flow stream and fluid components in a first upper flow stream. The first upper flow stream may be centrifuged about a substantially vertical axis of rotation to concentrate solid components in a second lower flow stream and fluid components in a second upper flow stream. The first lower flow stream, the second lower flow stream, or both, may be centrifuged about a substantially horizontal axis of rotation to separate water from stackable dry tailings.

The method and system may be applied to separation of tailings or other wastewater. Tailings are a by-product of many operations, for example mining operations. Tailings include at least a fluid component and a solid component. Prior to application of the process, sand may be removed from the tailings, for example by use of tailings beaches, resulting in suspended tailings including thin fine tailings ("TFT"), mature fine tailings ("MFT"), or both. TFT and MFT are suspensions of fines in water. Generally, the fines include particles of less than about 40 μm in their largest dimension. TFT include suspensions that are between 5 and 10 percent (w/w) suspended solids, for example about 8 percent (w/w) suspended solids. MFT include suspensions that are up to about 50 percent (w/w) suspended solids, for example between 30 and 35 percent (w/w) suspended solids, and may form colloidal suspensions. The process has application to tailings from mining operations, for example TFT and MFT from oil sands mining. Alternatively, the process may be applied to separation of solid and fluid components of other colloidal suspensions in other industries. In a further alternative, the process may be applied, for example, to separation of two fluids of varying density, for example water separated from bitumen swollen with $CO_2$, or separation of fluids from solids in treatment of sewage or other wastewater.

Tailings may include ultrafines (particles less than about 3 μm in diameter). In the settling ponds, the coarse sand and larger silt particles quickly settle out. The clays and other fines settle out over time, sometimes over a period of seven years or more. Ultrafines in the tailings lead to increased settling times in part because of steric forces between the particles, particle clusters, and ions in solution.

The process employs centrifugation to separate fines from the fluid components of tailings. The process may also employ acidification of the tailings, for example with $CO_2$, to increase the cation availability and to increase the ionic strength of the water. The resulting solid component may be stackable (Mikula et al., 2008).

Energy may be added to a colloidal suspension to overcome the $E_a$ for the transition from the colloidal suspension to a settled product, accelerating the settling process (e.g. by centrifuging the suspension). Alternatively, the environment of the colloidal suspension can be changed to reduce the required $E_a$ (e.g. by acidifying clay particles). Each of these mechanisms of accelerating settling of the colloidal suspension may be applied in the process.

Centrifuge Theory

Centrifuges generate centripetal acceleration by rotating at high speeds. The magnitude of the centripetal acceleration is given by $$a = \omega^2 r \qquad \text{[Eq. 2]}$$

In Eq. 2, r is the radius of a body being spun and ω is rotational velocity.

Dense particles in suspension experience three forces, which at steady state sum to zero. The first force is the centripetal force ("F") due to centripetal acceleration generated by the centrifuge:

$$F = ma \qquad \text{[Eq. 3]}$$

In Eq. 3, m is the mass of the particle.

The second force is the buoyant force ("$F_{ab}$"), which is force on the particle equivalent to that of the displaced water resulting in net centripetal force ("$F_n$") on the particle:

$$F_n = F_{ab} = V_p(\rho_p - \rho_w)\omega^2 r \qquad \text{[Eq. 4]}$$

In Eq. 4, $V_p$ is the particle volume, and $\rho_p$ and $\rho_w$ are the densities of the particle and of water, respectively.

The third force is the drag force on the particle, or the force of the fluid opposing the velocity of the particle in the parallel directions of the centripetal force. Where the particles have a very high aspect ratio (i.e. where the particles are long and narrow), the particles are likely to align with flow of fluid within which they are suspended.

The centrifuge creates pressure as it rotates with the highest pressure at the outside given by Eq. 5:

$$P_{r2} = P_{r1} + \pi\rho\omega^2(r_2^2 - r_1^2) \qquad \text{[Eq. 5]}$$

In Eq. 5, $P_{r1}$ is the pressure at the interface of the water at radius $r_1$ and $P_{r2}$ is the pressure at radius $r_2$, where $r_2 > r_1$. Where the density of the suspension is high enough that the particles contact and can partially support the pressure, pressure will contribute to compacting the suspension. At such a density, water is pushed out of the porosity by collapsing the solid structure under the pressure $P_{r2}$.

Acidifying Tailings with $CO_2$ and $CaCO_3$ Precipitation

Dissolution of $CO_2$ in water occurs by the following reaction:

When $CO_2$ is dissolved in water at a pressure of approximately 10 MPa, the resulting solution may have a pH of approximately 3 (Hangx, 2005). $CaCO_3$ in solution saturated by $CO_2$ will form soluble $Ca(HCO_3)_2$. Lowering the partial pressure of $CO_2$ results in evolution of $CO_2$ from solution. Evolution of $CO_2$ results in an increase of the pH of the solution. Increasing the pH results in precipitation of $Ca(HCO_3)_2$.

An increase in ionic concentration increases the strength of ionic interactions in the colloidal suspension, neutralizing the steric forces and facilitating settling, and also facilitates refoliation of the clay. $H_3O^+$ facilitates refoliation of the clay and makes the $\Delta H$ of hydration of the clay sheets more favorable. $H_3O^+$ and other cations bind to the negatively charged surfaces of the clay sheets. $H_3O^+$ interacts with the water about the clay sheets, neutralizing the sheets' negative surface charge, and lowers both the $\Delta H$ of hydration of the clay sheets and the $E_a$ for the colloidal suspension to reform into clay.

$CaCO_3$ precipitates onto negativity charged surfaces, for example those of quartz and clays. The large surface area of the fines organized into clay sheets makes them a preferred surface upon which precipitation may occur. Addition of $Ca(OH)_2$ to a solution of $CO_2$ may result in precipitation of $CaCO_3$ on to the sheets, neutralizing the net charge on the surface of the fines and facilitating aggregation of the fines into larger layers, further facilitating settling.

The tailings may include bitumen droplets emulsified with water. When exposed to $CO_2$, the droplets become less dense and the emulsion with water may break. $CO_2$ dissolves in bitumen, swelling the volume of the bitumen, for example by approximately 5-10%, reducing the density of the bitumen, and reducing the strength of the water-bitumen emulsion. In addition, caustic water from extraction of the bitumen often creates salts with organic acids in the bitumen. In the acidic environment, these salts revert to organic acids, lowering any surfactant tendency of the bitumen. In addition, these organic acids may facilitate removal of heavy metal ions from the water.

Process and System

FIG. 1 is a schematic of an embodiment of the process. The process of FIG. 1 has three stages. At stage one, fines in the tailings are separated from water, hydrocarbons, and ultrafines. At stage two, the ultrafines from stage one are precipitated as ooids ("ooids" are described below) and the water and hydrocarbons from stage one are recovered. At stage three, the fines from stage one and the ooids from stage two are further dewatered into stackable product, and the resulting water may be recovered for reuse.

Figure 2:
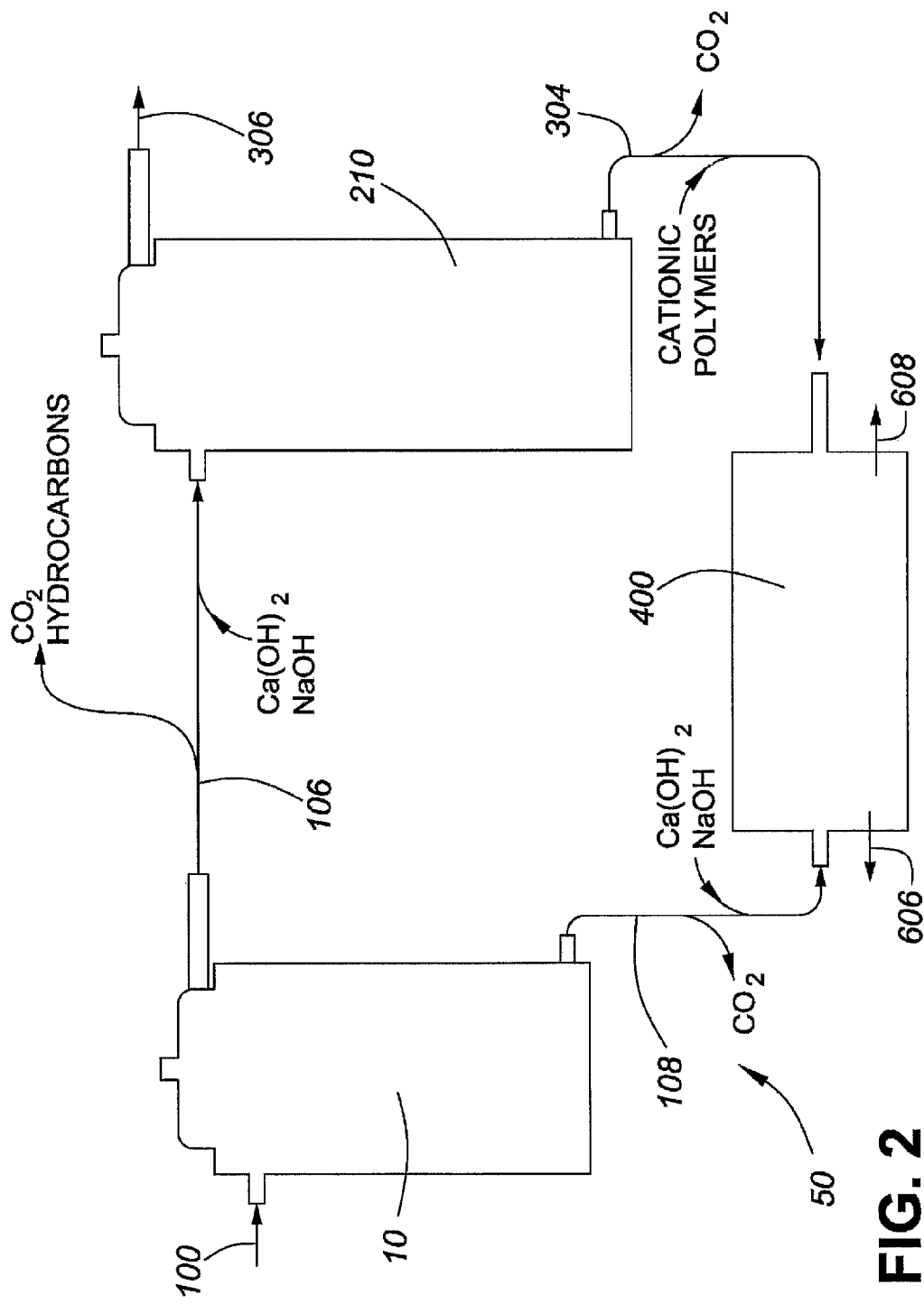
FIG. 2 is a schematic of a system for separating fines from tailings.
Figure 3:
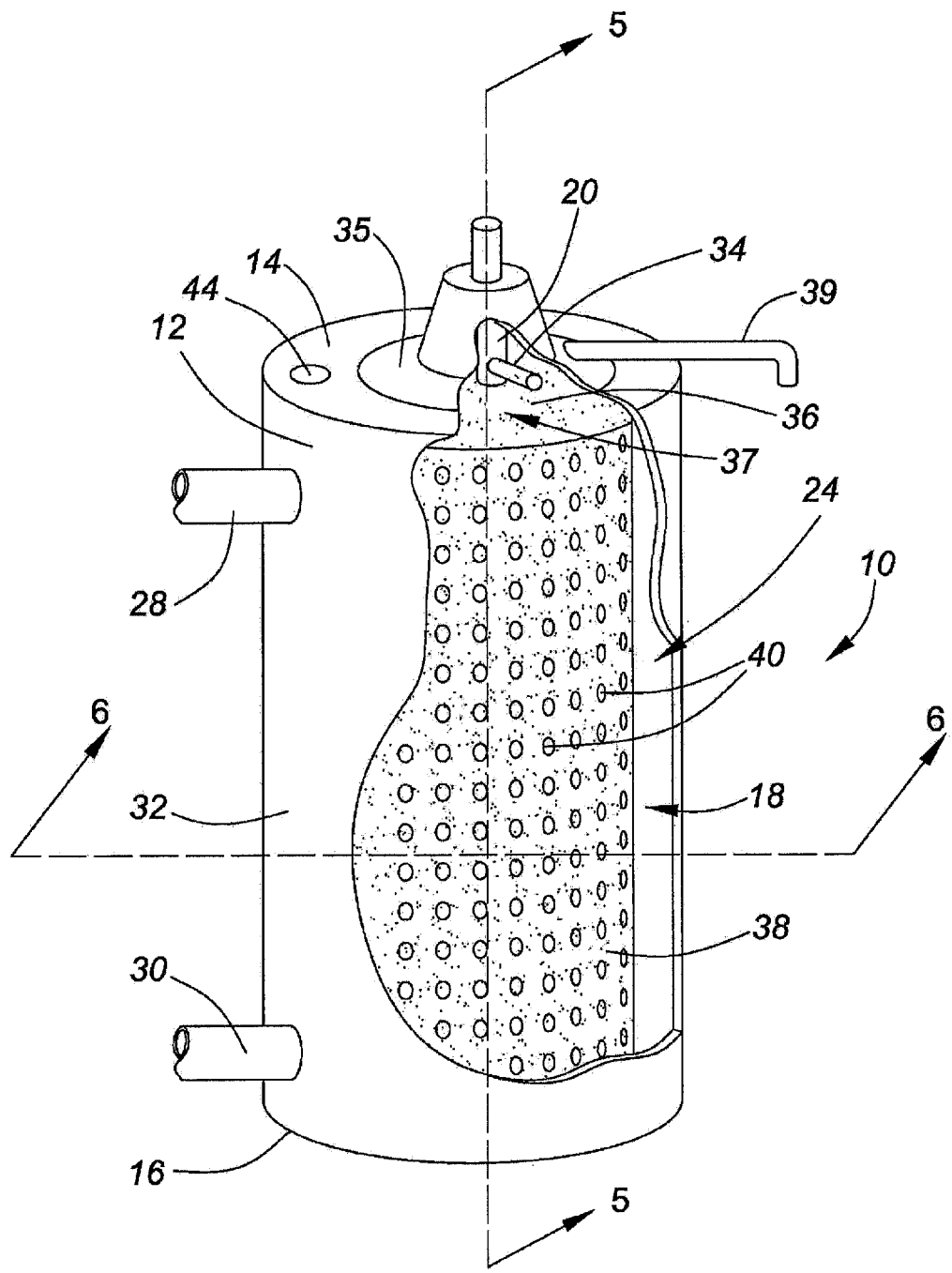
FIG. 3 is a partial cutaway perspective view of a centrifuge with a substantially vertical axis of rotation.
Figure 4:
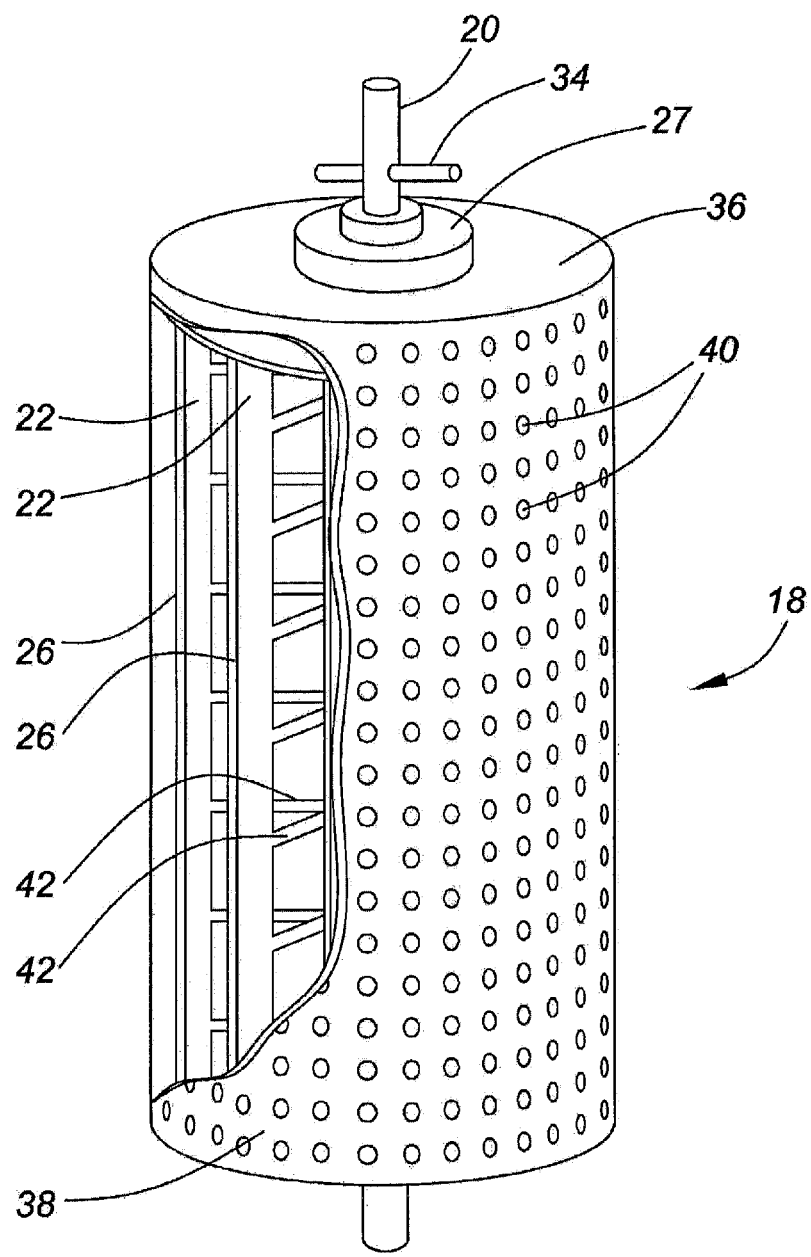
FIG. 4 is a partial cutaway perspective view of an inner assembly of the centrifuge of FIG. 3.
Figure 5:
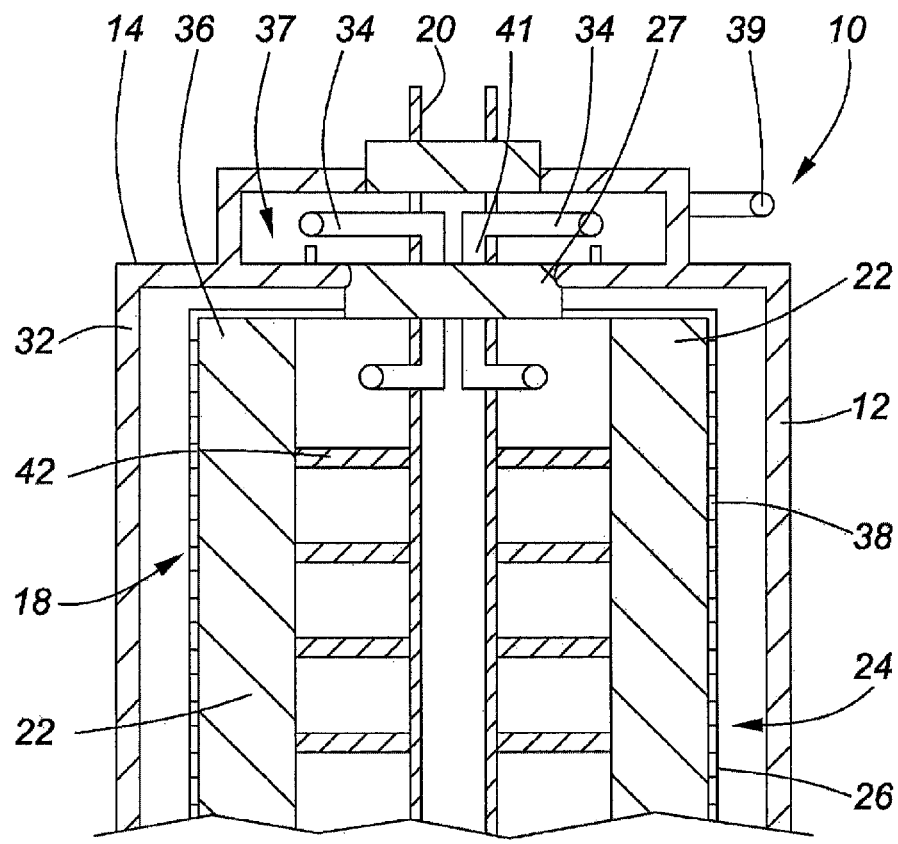
FIG. 5 is a cross-sectional elevation view of the centrifuge of FIG. 3 along the plane 5-5.
Figure 6:
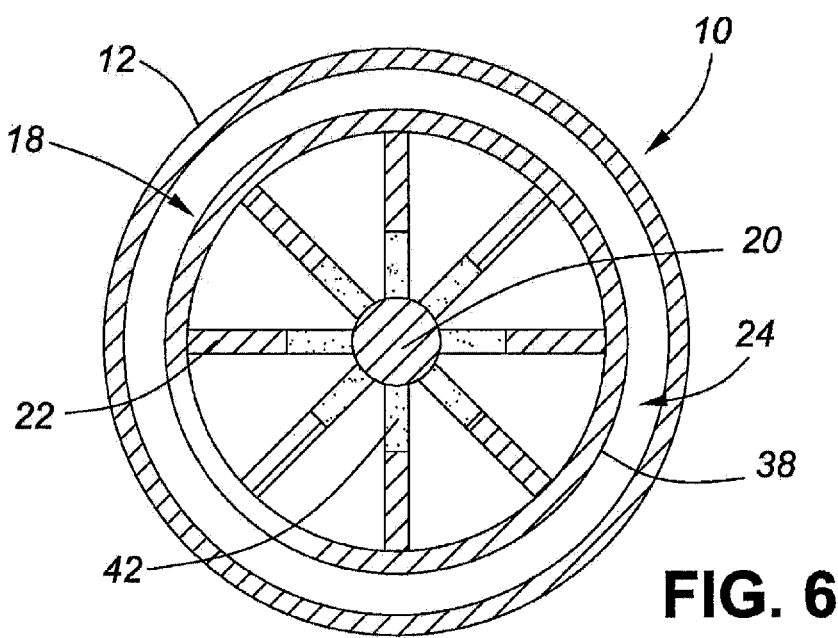
FIG. 6 is a cross-sectional plan view of the stage centrifuge of FIG. 3 along the plane 6-6.

FIG. 2 is a schematic of an embodiment of a system 50 used to carry out the process. The system includes a stage one centrifuge 10, a stage two centrifuge 210, and a stage three centrifuge 400. The roles of each of these components of the system 50 are described below according to each of the three steps of the method.

Stage One

Tailings 98 are provided, for example from used process water from which sand and silt have settled out in a settling pond. The tailings 98 may include TFT and MFT. The tailings 98 may be recovered from the settling pond for use as stage one feed 100. In an embodiment, the tailings 98 may be acidified by exposure to $CO_2$ at pressure, for example between 2 and 8 MPa $CO_2$, or at about 5 MPa, prior to use as stage one feed 100. Alternatively, $CO_2$ pressure may be between 7 and 13 MPa, or about 10 MPa. The stage one feed 100 may be about 95% water by volume, for example between 92% and 98%. Alternatively, the stage one feed 100 may have a lower percentage of water by volume, for example 65% to 70% or about 50%. The remaining components of the stage one feed 100 include fines (including ultrafines) and may include hydrocarbons.

The stage one feed 100 is separated by centripetal force and gravity. In an embodiment, a stage one centrifuge 10 (discussed below with reference to FIGS. 3 to 12) may be used, which applies a combination of centripetal force and gravity to separate a portion of the fines in the stage one feed 100 from water, hydrocarbons, and ultrafines in the stage one feed 100. Without being bound by theory, acidification may facilitate settling of fines and separation of the hydrocarbons may be facilitated by $CO_2$ swelling.

The stage one feed 100 is separated into a stage one upper flow stream 106 and a stage one lower flow stream 108. The stage one upper flow stream 106 includes water and ultrafines. The stage one upper flow stream 106 may include hydrocarbons and fines. The stage one lower flow stream 108 includes water and fines. The stage one lower flow stream 108 may include hydrocarbons and ultrafines. The concentration of fines in the stage one lower flow stream 108 will be greater than in the stage one feed 100. For example, of the fines present in the stage one feed 100, between about 2% (w/w) and about 40% (w/w) may be concentrated in the stage one lower flow stream 108. For example, of the ultrafines present in the stage one feed 100, between about 3% (w/w) and about 5% (w/w) may be concentrated in the stage one upper flow stream 106. The percentage may be affected by factors including, for example, the clays in the stage one feed 100, the radius of the centrifuge, the speed of rotation, the pH of the stage one feed 100, and the ionic strength of the stage one feed 100.

The stage one lower flow stream 108 may, for example, have a density of about 1,500 kg/m$^3$, for example between 1,300 kg/m$^3$ and 2,000 kg/m$^3$, and be flowable. A feed rate of stage one feed 100 of, for example 15,000 m$^3$/d, may produce 14,250 m$^3$/d of stage one upper flow stream 106 and 750 m$^3$/d of stage one lower flow stream 108.

In an embodiment, stage one lower flow stream 108 may be added to the stage one feed 100 to increase the rate of collisions between clay particles and facilitate aggregation and separation of fines from fluid. Once stage one of the process has reached a steady state, further addition of stage one lower flow stream 108 may be unnecessary.

Stage Two

In an embodiment, the process includes stage two. In stage two, ultrafines suspended in the stage one upper flow stream 106 are precipitated as ooids 300 and are separated from water present in the stage one upper flow stream 106. The ooids 300 are spherical structures which precipitate from $CaCO_3$ solutions.

In an embodiment, the stage one upper flow stream 106 may be alkalinized, for example by addition of $Ca(OH)_2$ and NaOH to the stage one upper flow stream 106. The resulting increase in pH facilitates formation of ooids 300 including $CaCO_3$. The ooids 300 may grow from nucleation points on particles of fines. In an embodiment, addition of $Ca(OH)_2$ and NaOH raises the pH of the stage one upper flow stream 106 to about 8, for example between 7.5 and 8.5.

The stage one upper flow stream 106 with $Ca(OH)_2$ and NaOH is separated by centripetal force and gravity. In an embodiment, a stage two centrifuge 210 (discussed below with reference to FIGS. 13 and 14) may be used, which applies a combination of centripetal force and gravity to separate a portion of the ultrafines (precipitated as ooids 300) in the stage one upper flow stream 106 from water in the stage one upper flow stream 106.

The stage one upper flow stream 106 with $Ca(OH)_2$ and NaOH is separated into a stage two upper flow stream 306 and a stage two lower flow stream 304. The stage two upper flow stream 306 includes water and may be useful for reuse in a hot water extraction process. The stage two lower flow stream 304 includes the ooids 300 that precipitate from the stage one upper flow stream 106. During centrifugation, the ooids 300 may remain suspended in solution and migrate to the bottom and outside of the centrifuge as they increase in size. The longer the ooids 300 are in the suspension, the more the ooids 300 will grow, increasing the extent to which they will be affected by gravity and centripetal force.

In an embodiment, material may be added to provide nucleation points for formation of ooids 300, resulting in facilitated nucleation of the fines to form ooids 300. The material may for example be clay, quartz, or carbonate, and may have a particle size of, for example, about 40 microns in the largest dimension. A greater surface area to mass ratio of the added material will facilitate nucleation.

In an embodiment, the stage one lower flow stream 108 is centrifuged under pressure. In an embodiment, the pressure is between 2 and 8 MPa $CO_2$, or at about 5 MPa. In an embodiment, the pressure is between 7 and 13 MPa, or about 10 MPa.

In an embodiment, the stage one upper flow stream 106 may be degassed prior to centrifugation, for example at atmospheric pressure, between 2 and 8 MPa pressure, or at about 5 MPa pressure, to allow evolution of some $CO_2$ from solution. $CO_2$ vapour may be recovered from the stage one upper flow stream 106, for example with a vapour recovery unit ("VRU"; not shown). For example, a first tank and a second tank in series (not shown), each equipped with a skimmer and a VRU, may be used to recover $CO_2$.

Placement of the stage one upper flow stream 106 into the first and second tanks allows the $CO_2$ to evolve from solution in the stage one upper flow stream 106. Without being bound by theory, the $CO_2$ may nucleate on some of the ultrafines and float them to surface. Hydrocarbons remaining in the stage one upper flow stream 106 may float to the top of the stage one upper flow stream 106, which may be facilitated where the hydrocarbons are swollen with $CO_2$. The skimmer may be used to remove ultrafines and hydrocarbons from the surface of the tops flow stream. The hydrocarbons may include hydrophobic minerals, for example titanium and zirconium (Majid et al., 2005), which may also be recovered. $Ca(OH)_2$ and NaOH may be added in the second tank prior to adding the stage one upper flow stream 106 with $Ca(OH)_2$ and NaOH to the stage two centrifuge.

Stage Three

In an embodiment, the process includes stage three. In stage three, stage three feed is separated into stackable product and water. In an embodiment, the stage three feed may be the stage one lower flow stream 108. In an embodiment, the stage three feed includes a combination of the stage one lower flow stream 108 and the stage two lower flow stream 304, and the combined lower flow streams are separated into stackable product and water. The water may be reused as process water. The stackable product may be used to reclaim mine sites. The stackable product includes aggregated fines and water. The stackable product may for example have a density of between 1700 to 2000 $kg/m^3$, for example about 1850 $kg/m^3$ (approximately 30% water). Lower water fractions in the stackable product may be achievable, depending on a number of factors, including the solid's porosity (with greater porosity fines retaining more water) and economic considerations.

In an embodiment, the stage three feed may be separated into stackable product and water in a stage three centrifuge (discussed below with reference to FIGS. 15 to 23). The stage three centrifuge is elongate with a substantially horizontal axis of rotation and includes a rake for skimming an inner surface of the centrifuge to displace suspended solids along the axis of rotation.

In an embodiment, the stage one lower flow stream 108 may be degassed to remove $CO_2$ prior to separation of the stage one lower flow stream 108 into stackable product and water. In an embodiment, the stage two lower flow stream 304 may be degassed prior to introduction of the stage two lower flow stream 304 into stackable product and water. Degassing may be in a tank with a VRU providing atmospheric pressure or lower.

In an embodiment, $Ca(OH)_2$ and NaOH may be added to the stage one lower flow stream 108 to precipitate $CaCO_3$. Precipitation of $CaCO_3$ removes additional $CO_2$ from solution and facilitates aggregation of fines. Without being bound by theory, the stage two lower flow stream 304 may increase the pH of the stage one lower flow stream 108 and cause further precipitation of $CaCO_3$ from the stage one lower flow stream 108.

In an embodiment, cationic polymers may be added to either the stage one flow stream, the stage two lower flow stream 304, or both, prior to introducing the lower flow streams into the stage three centrifuge. Addition of cationic polymers may facilitate aggregation and precipitation of the fines. The more $CaCO_3$ that has already precipitated from either the stage one lower flow stream 108, the stage two lower flow stream 304, or both, the less the benefit of adding cationic polymers.

Stage One Centrifuge

Figures 11, 12:
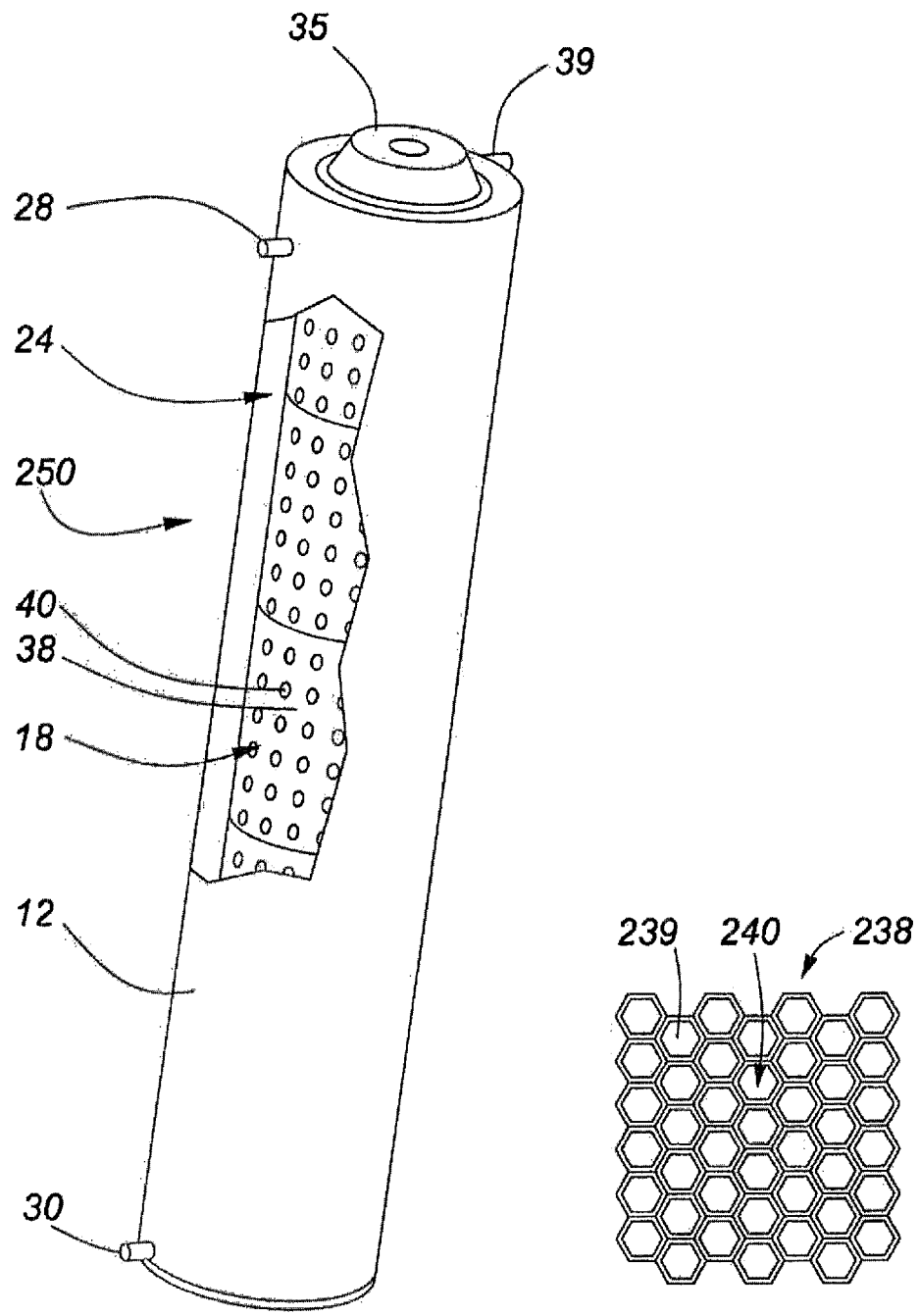
FIG. 11 is a detail view of a permeable sheet with hexagonal apertures for use with an inner assembly (e.g. of FIG. 4 or 9)
FIG. 12 is an elevation partial cutaway view of an alternative centrifuge with a substantially vertical axis of rotation.
Figure 15:
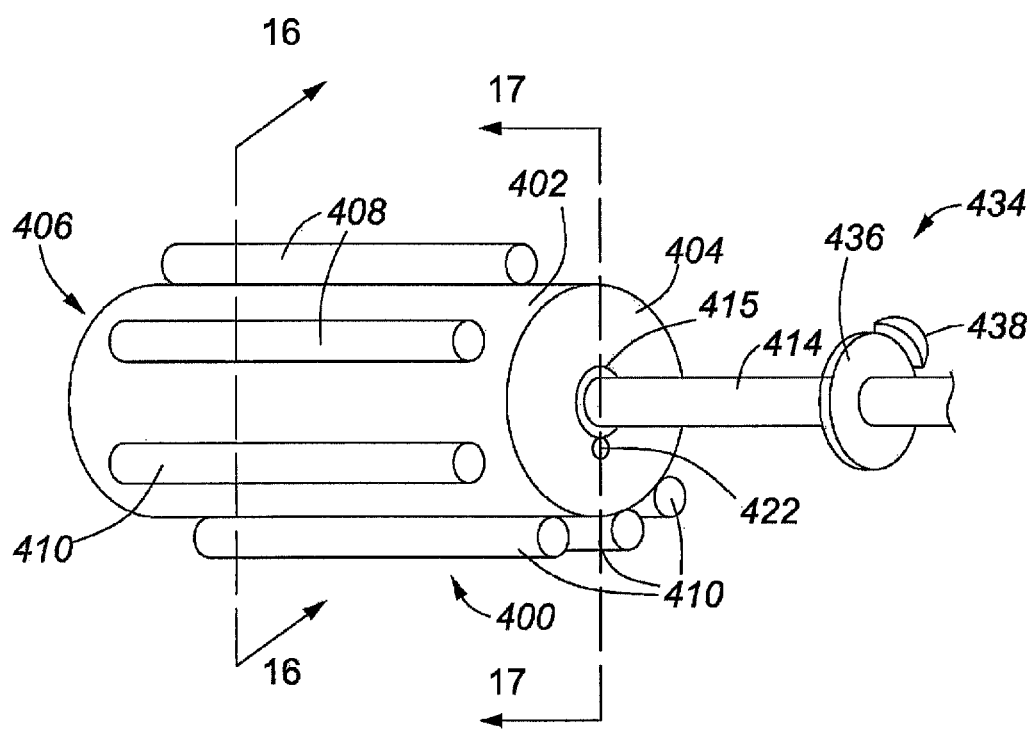
FIG. 15 is a perspective view of a centrifuge with a substantially horizontal axis of rotation.

FIGS. 3 to 8 show a stage one centrifuge 10. The stage one centrifuge 10 includes a body 12 with a top 14 and a bottom 16. The inner assembly 18 is within the body 12. The inner assembly 18 includes a drive shaft 20 and a plurality of paddles 22 connected to the drive shaft 20 by connectors 42. The inner assembly 18 is drivingly engaged by the drive shaft 20. A discharge space 24 is between an outer edge 26 of the paddles 22 and an inner surface of the body 12. Bearings 27 are mounted in the body 12 to allow rotation of the drive shaft 20. The drive shaft 20 is substantially vertical, and may be vertical (e.g. in the stage one centrifuge 10). As a result, an axis of rotation about the drive shaft 20 is substantially vertical. The extent to which the axis of rotation of the drive shaft 20 may be off the vertical and still achieve the performance required for a given application will depend on the given application and operating parameters of a given embodiment. For example, in some embodiments, the drive shaft 20 may be off the vertical by up to 10 degrees (e.g. in the stage one centrifuge 210 of FIG. 12 is off the vertical by about 10 degrees).

The stage one centrifuge 10 includes a baffle for dampening turbulence in the suspension during centrifugation as fluid components 104 (FIGS. 7 and 8) flow into the center of the inner assembly 18. The baffle is exemplified in the stage one centrifuge 10 as a shroud 38 connected to the drive shaft 20, the shroud 38 including a plurality of apertures 40 to facilitate flow of fluids through the shroud 38. The paddles 22 are within the shroud 38, and the discharge space 24 is defined between the shroud 38 and the inner surface of the body 12. Other suitable baffles may be employed and located between the drive shaft 20 and the inner surface of the body 12. Without being bound by theory, the baffle, exemplified by the shroud 38, may decrease turbulence in the suspension during centrifugation by increasing the uniformity of fluids passing through the apertures 40 toward the center of the inner assembly 18, which may decrease the likelihood that suspended solids are swept by fluids migrating toward the center of the inner assembly 18.

The stage one feed 100 flows into the discharge space 24 through a feed inlet 28, exemplified as being in an outer shell wall 32 of the body 12. A lower flow stream outlet 30 for discharging the lower flow stream 108 is proximate the bottom 16. The lower flow stream outlet 30 may be in an outer shell wall 32, or may be in the bottom 16 and co-extensive with at least a portion of the discharge space 24. An upper flow stream outlet 34 for discharging the upper flow stream 106 is proximate the top 14. In an embodiment, and as shown in the figures, the upper flow stream outlet 34 may be at least partially within the drive shaft 20 to allow the stage one top flow stream to flow out of the upper flow stream outlet 34 during rotation of the drive shaft 20.

Operation of Stage One Centrifuge

Figure 7:
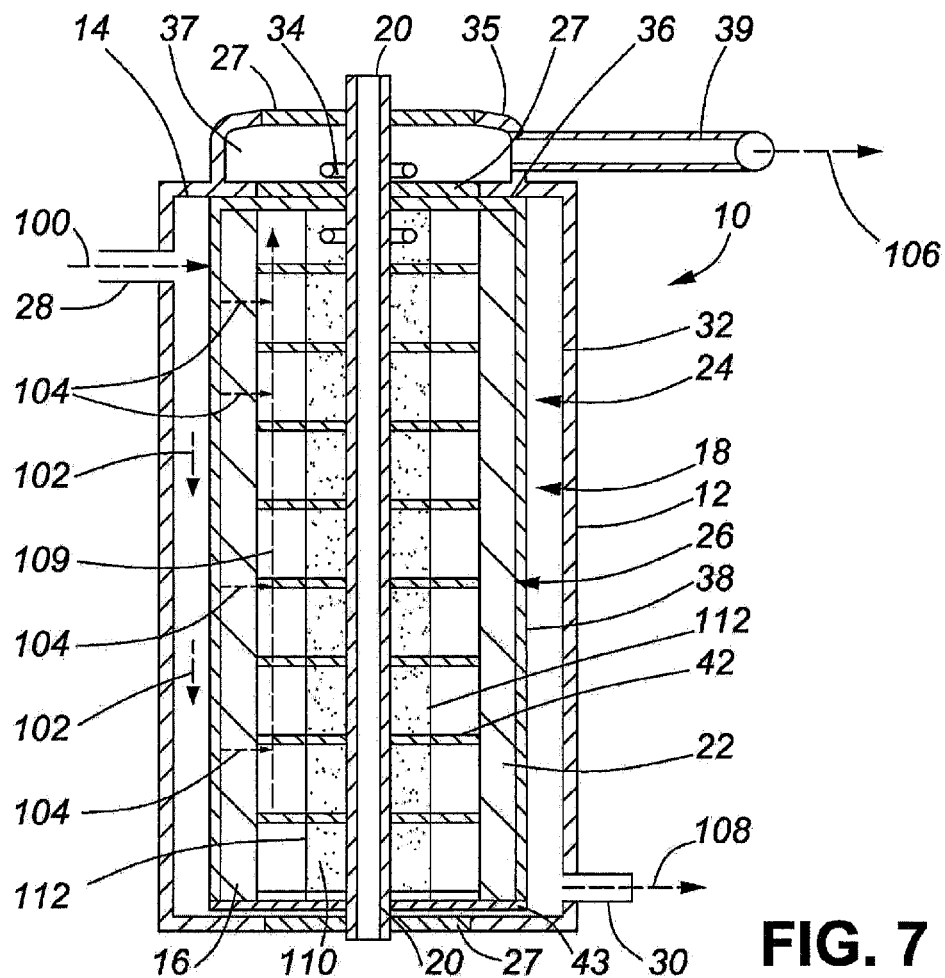
FIG. 7 is a cross-sectional elevation view of the centrifuge of FIG. 3 along the plane 5-5 in operation.
Figure 8:
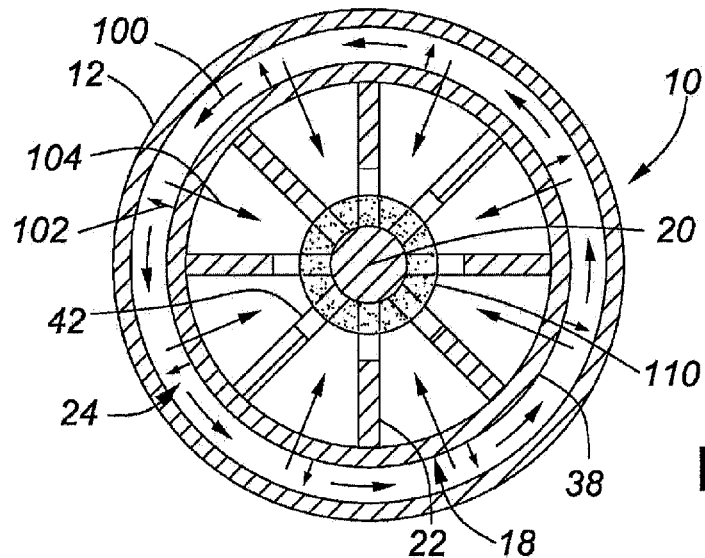
FIG. 8 is a cross-sectional plan view of the centrifuge of FIG. 3 along the plane 6-6 in operation.

FIGS. 7 and 8 show the stage one centrifuge 10 in operation. Stage one feed 100 is added to the discharge space 24 through the feed inlet 28. The drive shaft 20 is rotated to generate centripetal forces many hundreds the force of gravity at the outer edges 26 of the paddles 22. For example, where the stage one centrifuge 10 has a diameter of 1.5 m at the outer edges 26, rotation at 60 m/s will generate a force of approximately 400 G at the outer edges 26. Centrifugal forces of, for example, between 100 and 700 G may also be effective for separating fines from stage one feed 100. For other applications, for example separating hydrocarbons from water, lower centrifugal forces may be effective, for example about 200 G. Gravity and centripetal force each contribute to separating solid components 102 of the stage one feed 100 from fluid components 104. Gravity draws the solid components 102 down. Centripetal force urges the solid components 102 outward.

Centripetal force is greater proximate the outer surface of the inner assembly 18 than at points closer to the drive shaft 20 (e.g. at surface of the shroud 38; in embodiments where the baffle is located further inward relative to the outer edges 26 of the paddles, centripetal force may be greater proximate the outer edges 26 than at points closer to the drive shaft 20). The greater centripetal force facilitates separation of solid components 102 from fluid components 104 of the stage one feed 100 at the interface between the shroud 38 and the discharge space 24. Separation of the fluid components 104 from the solids components 102 occurs primarily at the shroud 38. In addition, the greater bulk density of the stage one feed 100 compared to upper flow stream 106 proximate the top 14 may facilitate separation of the fluid components 104 from the solid components 102 based on differences in bulk density. The fluid components 104 passing through the apertures 40 in the shroud 38 will include a proportion of the suspended solids which do not follow the solid components 102 to the inner surface of the body 12.

Without being bound by theory, the action of the stage one centrifuge 10 concentrates the solid components 102 in the discharge space 24 proximate the bottom 16, producing stage one lower flow stream 108, which includes water and solid components 102. The stage one lower flow stream 108 may be removed from the stage one centrifuge 10, for example by a worm gear (not shown). The fluid components 104 are displaced upward, producing the stage one upper flow stream 106. The stage one upper flow stream 106 may for example include water, hydrocarbons, and ultrafines. The stage one upper flow stream 106 flows out of the stage one centrifuge 10 through the second upper flow stream discharge outlet 39.

Without being bound by theory, if the stage one feed 100 has a lowered pH, the surfaces of clay sheets may be neutralized by $H_3O^+$, facilitating aggregation of the fines and therefore facilitating separation of fines from water, hydrocarbons, and ultrafines. Clay sheets may align themselves with the flow, presenting a small aspect ratio to the flow and lowering drag force on the fines.

Without being bound by theory, rotation of the inner assembly 18 may transfer energy to a colloidal suspension in the stage one feed 100 which is fed into in the discharge space 24. The energy transferred may be sufficiently high to overcome the $E_a$ and break down the colloidal suspension in the discharge space 24, facilitating flow of stage one lower flow stream 108 out of the body 12. The energy transferred may also be sufficiently low to not cause excessive turbulent flow in the discharge space 24 to impede settling of the solid components 102.

The shroud 38 may lower the amount of energy transferred from the paddles 22 to the stage one feed 100. Without being bound by theory, the presence of the shroud 38 may mitigate erosion of the body 12 by the stage one feed 100 during centrifugation. In addition, a boundary effect in the discharge space 24 may reduce the flow near the inner surface of the body 12, where the viscosity of the stage one feed 100 due to the solid components 102 will be the greatest. The boundary effect thus provides a slow moving viscous mud at the inner surface of the body 12 and contributes to lowering erosion of the inner surface of the body 12. These effects may be more pronounced in embodiments where the inner shell 12 has a smooth inner surface.

The radial dimension of the paddles 22 and the rotational velocity during operation determine the drag force on suspended particles in the stage one feed 100. Without being bound by theory, the larger the radial dimension of the paddles 22, the higher the bulk flow velocity of the water, resulting in the removal of smaller particles. At a greater radial dimension of the paddles 22, the pressure generated by the paddles 22 during operation increases.

In an embodiment, stage one lower flow stream 108 may be reintroduced into the discharge space 24 to provide nucleation points for aggregation of fines. The stage one lower flow stream 108 may be introduced in the discharge space 24 during operation or prior to the stage one feed 100 entering the discharge space 24 through the feed inlet 28.

During operation of the stage one centrifuge 10, a column 110 of $CO_2$ gas may form in the center of the inner assembly 18. The pressure at the fluid-$CO_2$ interface 112 may be kept at a selected pressure to provide a selected result, for example 10 MPa to keep the concentration of $CO_2$ dissolved in the stage one feed at a selected value and maintain a selected pH. The column 110 may be regulated using the relief valve 44. Without being bound by theory, the column 110 may mitigate the tendency for fluids being centrifuged to cause cavitation on the drive shaft 22.

In an embodiment, a level controller (not shown) may detect differential pressures between atmospheric and within the centrifuge 10 to regulate the flow out of the upper flow stream outlet 34. At a pressure of 10 MPa, the body 12 may be exposed to pressures of about 30 MPa during operation as a result of pressure generated by the paddles. Pressure generated by the paddles 22 during operation may be reduced by reducing the thickness of the water and maximizing the diameter of the column 110, or by reducing the rotational speed of the paddles 22.

Design considerations for the stage one centrifuge 10 are influenced by factors including the selected daily flow rate of stage one feed 100 into a single stage one centrifuge 10.

The proportion of stage one feed 100 that will generate stage one upper flow stream 106 and stage one lower flow stream 108 will be determined by, among other factors, the specific stage one feed 100 being treated, and the speed at which the stage one centrifuge 10 is operated. For example, 15,000 m$^3$/d of stage one feed 10 may added to the discharge space 24, and 80% of the stage one feed 100 volume may be stage one upper flow stream 106 while the remaining 20% of the stage one feed 100 volume may be stage one lower flow stream 108. In this example, the rate of flow from the lower flow stream outlet 30 may be about 3,000 m$^3$/d of stage one lower flow stream 108 that is 50% by volume water with a density of 1,500 kg/m$^3$. In contrast, the rate of flow from the upper flow stream outlet 34 may be about 12,000 m$^3$/d of the stage one upper flow stream 106 that is (which is predominantly water with a small around of fines, ultrafines, and hydrocarbons). The rate that the stage one lower flow stream 108 is removed at will have to be selected to account for these and other factors.

Alternative Features in the Stage One Centrifuge

In an embodiment, a second body 35 extends from the top 14 to provide an upper flow stream discharge space 37. An upper flow stream discharge passage 41 provides fluid communication between the body 12 and the upper flow stream outlet 34. The upper flow stream discharge outlet 34 is in fluid communication with the upper flow stream discharge space 37. A second upper flow stream discharge outlet 39 provides fluid communication between the upper flow stream discharge space 37 and the exterior of the stage one centrifuge 10.

In an embodiment, the inner assembly 18 includes an inner assembly top 36 and an inner assembly bottom 43. The inner assembly top 36 and inner assembly bottom 43 prevent backflow of stage one upper flow stream 106 into the inner assembly 18. The inner assembly top 36 and the inner assembly bottom 43 are each wear surfaces and may be hardened to withstand abrasion, may be designed to be easily replaced, or both. In an embodiment, the shroud 38 may be a smooth material, for example sheet metal, to provide a smooth outer surface of the shroud 38. In an embodiment, protrusions (not shown) may extend from the inner surface of the body 12 to slow fluid flow near the inner surface of the body 12, reducing erosion of the body 12.

In an embodiment, the paddles 22 may have a negatively-charged surface to facilitate alignment of clay particles with the flow of fluid when the stage one centrifuge 10 is in operation to reduce drag. For example, the paddles 22 may be exposed to a negative charge, or the body 12 may be exposed to a positive charge. Alternatively, a suitable coating may be applied to the paddles 22 to provide a negative charge to the paddles (for example, a plastic or other material that allows a static electric charge to be built up) (Shainberg et al., 1982; Laurent et al., 2006).

In an embodiment, the shroud 38 may have a negatively-charged surface to facilitate alignment of clay particles with the flow of fluid when the stage one centrifuge 10 is in operation to reduce drag.

In an embodiment, the connectors 42 may be substantially perpendicular to the paddles 22.

In an embodiment, the feed inlet 28 may be proximate the top 14. In an embodiment, the feed inlet 28 may be in the top 14.

In an embodiment, a plurality of stage one feed inlets 28 may be distributed along the length, the periphery, or both, of the body 12. This may decrease differences in bulk density of material in the stage one centrifuge.

In an embodiment, the drive shaft 20 may be powered by a variable speed motor (not shown). The motor may, for example, be an electric motor.

In an embodiment, a pressure relief valve 44 is in the body 12 to relieve pressure from within the body.

In an embodiment, a pump, for example a metering pump, is present on the stage one centrifuge 10 to provide $CO_2$ to the stage one feed 100 at a selected concentration. For example, the $CO_2$ may be provided at a pressure selected to result in a partial pressure of 10 MPa $CO_2$ in the centrifuge. For example, the $CO_2$ may be provided at a pressure selected to result in a partial pressure in the centrifuge equal to that of a column of $CO_2$ gas (for example column 110 in FIGS. 7 and 8).

In an embodiment, the stage one centrifuge 10 may include features to control the rate of removal of the stage one lower flow stream 108. For example, the lower flow stream outlet 30 may include a worm gear (not shown). In an embodiment, the rate of removal may be controlled based on a selected density of stage one lower flow stream 108 in the discharge space 24. For example, removal may begin when the density of the stage one lower flow stream 108 is sufficiently great.

FIGS. 9 and 10 show an alternative inner assembly 218 for the stage one centrifuge 10. In the inner assembly 218, the paddles 22 extend to the drive shaft 20 along substantially their entire longitudinal lengths, in contrast to being connected to the drive shaft 20 by connectors 42 as in the inner assembly 18. Disc supports 242 are present in place of the connectors 42 and compartmentalize the inner assembly 218. Without being bound by theory, compartmentalization of the inner assembly 218 may further increase the uniformity of fluids passing toward the center of the inner assembly 218, which may further decrease the likelihood that suspended solids 102 are swept by fluids 104 migrating toward the center of the inner assembly 218.

FIG. 11 shows an alternative shroud 238 having apertures 240 in the shape of hexagons. A permeable sheet 239 is present at the base of the apertures 240 for allowing fluids to pass through the shroud 238. In an embodiment, the apertures 240 may be about 25 mm in depth and about 3 mm between points on the hexagonal cross section of the apertures 240.

FIG. 12 shows an alternative centrifuge 250 with a substantially vertical axis of rotation that is off the vertical by about 10 degrees.

Stage Two Centrifuge

FIG. 13 is a cross-sectional elevation view of a stage two centrifuge 210 in operation. FIG. 14 is a plan view of a base 204 of the stage two centrifuge 210. The stage two centrifuge 210 includes features common to the stage one centrifuge 10. In addition to the features common to the stage one centrifuge 10, the stage two centrifuge 210 includes a cyclone separator 202 at the bottom of the stage two centrifuge 210. The drive shaft 20 and inner assembly 18 are supported on a base 204 anchored to the body 12 by legs 206. Rotation of the inner assembly 18 provides a rotating flow to separate ooids 300 from stage two upper flow stream 306.

In an embodiment, the stage two centrifuge 210 may include a plurality of additive inlets 208 along the wall 32 for introducing chemicals to the discharge space 24. For example, addition of $Ca(OH)_2$ may ensure that fluid in the body 12 (for example stage one upper flow stream 106) is saturated with $CaCO_3$.

In an embodiment, the inner surfaces of the stage two centrifuge 210 are coated with a material to which $CaCO_3$ is unlikely to bind, for example a non-polar surface coating. In an embodiment, the volume of the discharge space 24 may be selected to facilitate formation of ooids 300 (see "Operation of Stage Two Centrifuge", below) by allowing the ooids 300 more time to form. A smaller discharge space 24 may facilitate faster flow of fluids during centrifugation, greater mixing with turbulence, and more rapid coating of fines with $CaCO_3$ to form ooids 300. A larger discharge space 24 may facilitate greater resonance time but may also slow flow of fluids during centrifugation, reduce mixing with turbulence, and slow coating of fines with $CaCO_3$, impeding formation of ooids 300 (relative to a smaller discharge space 24).

Operation of Stage Two Centrifuge

In operation, stage one upper flow stream 106 is introduced to the discharge space 24 through the feed inlet 28. The stage one upper flow stream 106 may be alkalinized, for example by addition of $Ca(OH)_2$ and $OH^-$ (for example as NaOH). In an embodiment, the stage one upper flow stream 106 is alkalinized prior to introduction into the discharge space 24. In an embodiment, the stage one upper flow stream 106 is alkalinized following introduction into the discharge space 24, for example by addition of $Ca(OH)_2$ and $OH^-$ at the inlets 208.

Without being bound by theory, ooids 300 form in the alkalinized stage one upper flow stream 106 during operation of the stage two centrifuge 210. The ooids 300 are drawn down by gravity and urged outward towards the body 12 by centripetal force. As a result of the movement of ooids 300, fluid components 302 of the stage one upper flow stream 106 flow upward. Stage two lower flow stream 304, which includes ooids 300 and water, is collected by the cyclone separator 202 and flows out of the stage two centrifuge 210 through the lower flow stream outlet 30. The ooids 300 become more likely to settle as they increase in size. The ooids 300 will increase in size where they are exposed to $CaCO_3$ at elevated pH. Stage two upper flow stream 306, which includes water, flows out of the upper flow stream outlet 34 and second upper flow stream discharge outlet 39.

Stage Three Centrifuge

FIGS. 15 to 19 and 23 show a stage three centrifuge 400. The stage three centrifuge 400 includes an elongate body 402 having a fluid discharge end 404 and a solids discharge end 406. A separation zone 403 is defined within the body 402. The centrifuge 400 includes a rotation driver for the body 402, exemplified by a plurality of drive wheels 408 and to provide rotational acceleration to the body 402 about the longitudinal axis of the body 402, and a plurality of support wheels 410 to support the body 402. In some embodiments, the rotation driver may alternatively include a single drive wheel 408, a single support wheel 410, or may alternatively provide rotational drive and support to the body 402 by suitable devices other than drive wheels 408 and support wheels 410.

The rake assembly 412 is within the body 402. The rake assembly 412 includes a drive shaft 414 to provide rotational acceleration to the rake assembly 412. The drive shaft 414 is mounted in the fluid discharge end 404 and the solids discharge end 406 in bearings 415 in the body 402 to facilitate rotation of the rake assembly 412 independently of the body 402.

The rake assembly 412 includes a rake 432 connected to the drive shaft by a plurality of connectors 416. The rake 432 may, for example be between about 2.5 and 5 cm in width, and is separated from the inner surface of the body 402 by a relatively small distance (e.g. about 2 mm; see further details below and in "Operation of Stage Three Centrifuge"). The rake 432 pushes solids to the solids discharge end 406 when the rake assembly 412 is rotated relative to the body 402. In the exemplified embodiment, the rake 432 extends substantially along the entire length of the body 402 along a helical path to push solids to the solids discharge end 406 during rotation of the rake 432, but any suitable design of rake 432 may be included in the rake assembly 412 for pushing solids to the solids discharge end 406 when the rake assembly 412 is rotated relative to the body 402. An inside diameter of the body 402 becomes smaller approaching the solids discharge end 406, forming a slope 418. The rake 432 and connectors 416 are sized to match the slope 418 and conform to an inner diameter of the body 402 along the length of the body 402. The slope 418 provides a path for solids to reach a solids discharge outlet 420. At the fluid discharge end 404, a fluid discharge outlet 422 is present at a given level selected provide a selected output of fluid from the stage three centrifuge 400.

The body 402 and the drive shaft 414 are each elongate along an axis that is substantially horizontal, and may be horizontal (e.g. in the stage three centrifuge 400). As a result, a common axis of rotation of the body 402 and of the drive shaft 414 is substantially horizontal. The extent to which the axis of rotation may be off the horizontal and still achieve the performance required for a given application will depend on the given application and operating parameters of a given embodiment. For example, in some embodiments, the axis of rotation may be off the horizontal by up to about 20 degrees.

Figure 16:
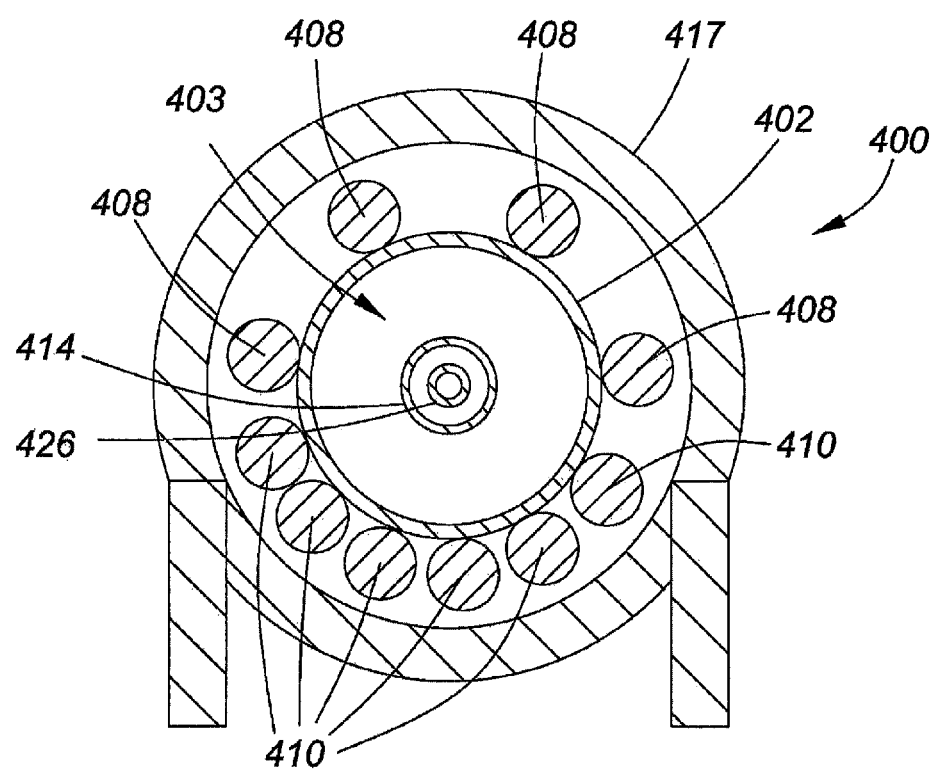
FIG. 16 is a cross-sectional elevation view of the centrifuge of FIG. 15 along the plane 16-16.
Figure 17:
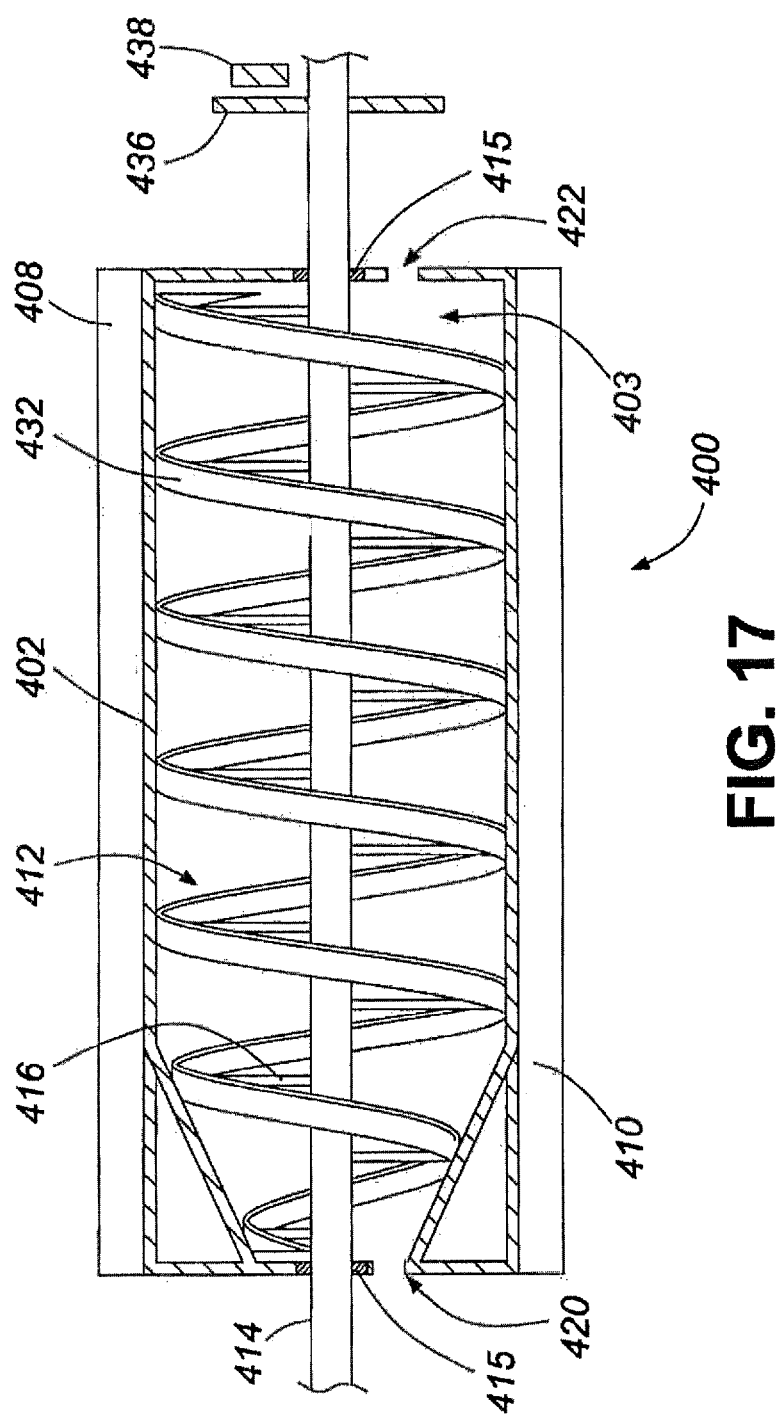
FIG. 17 is a cross-sectional elevation view of the centrifuge of FIG. 15 along the plane 17-17 showing a rake assembly and drive shaft without cross section.
Figure 18:
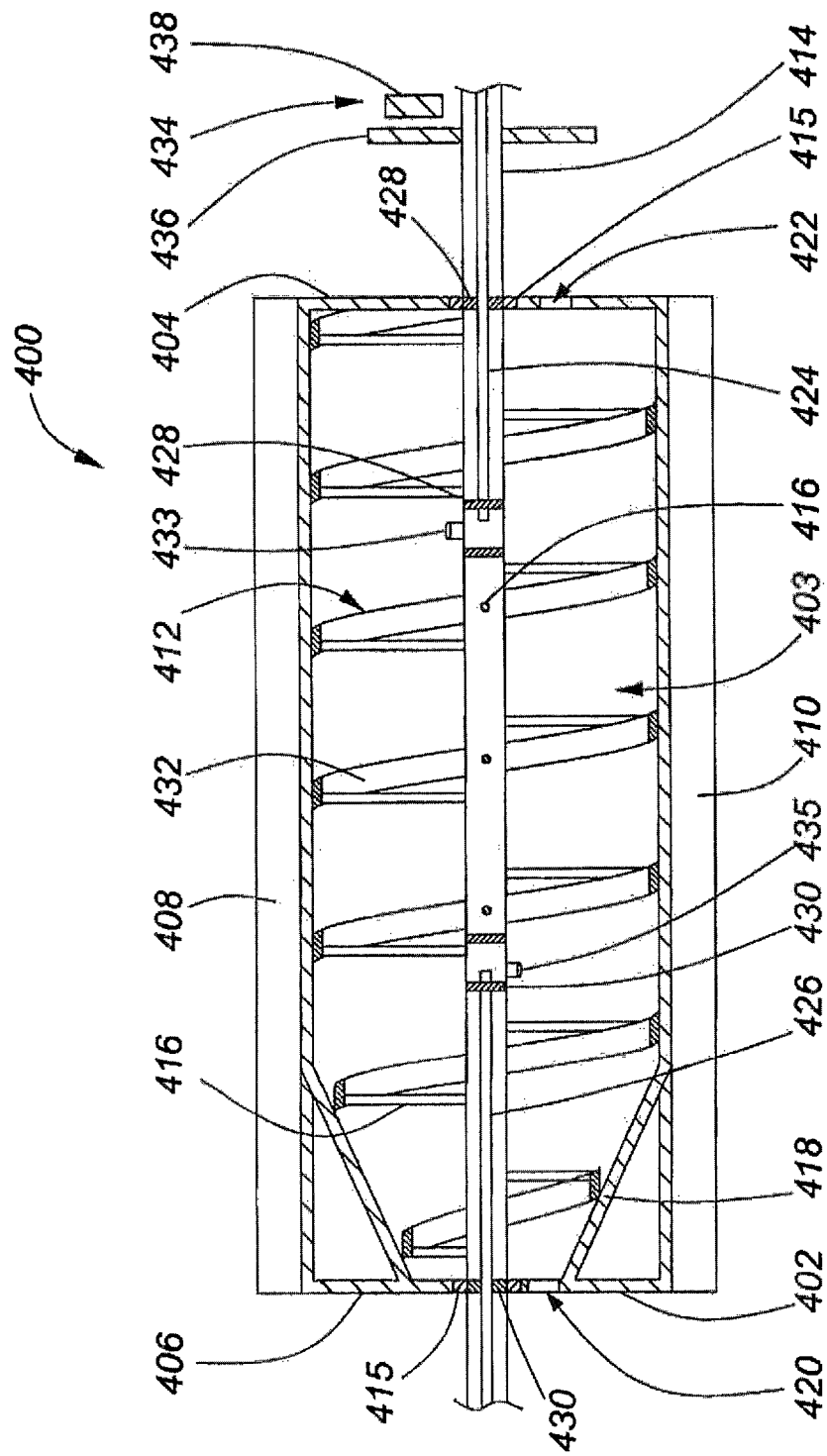
FIG. 18 is a cross-sectional elevation view of the centrifuge of FIG. 15 along the plane 17-17 showing the rake assembly and drive shaft in cross section.
Figure 19:
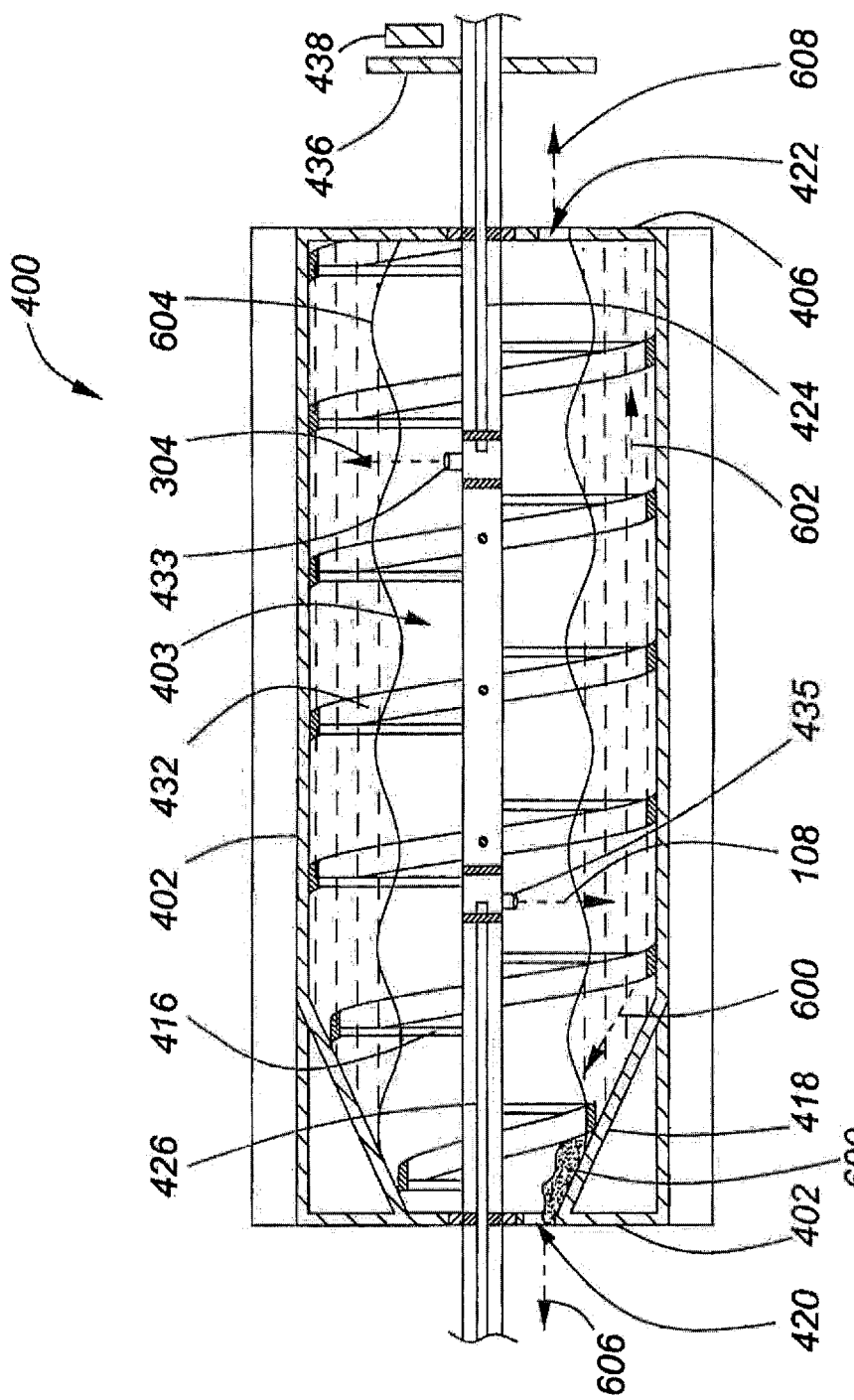
FIG. 19 is a cross-sectional elevation view of the centrifuge of FIG. 15 along the plane 17-17 showing the rake assembly and drive shaft in cross section in operation.
Figure 23:
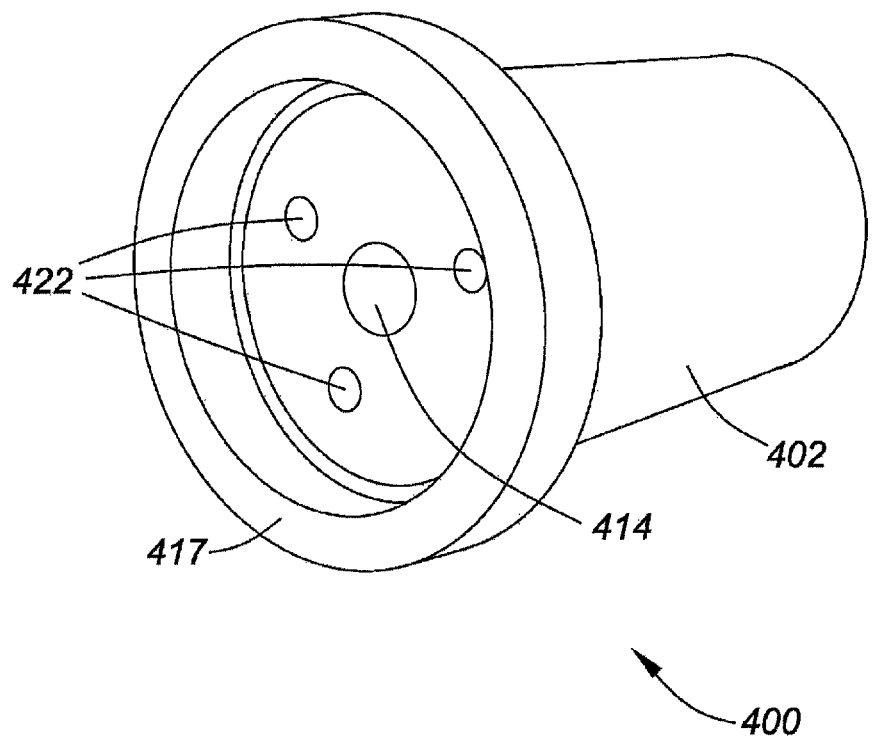
FIG. 23 is a perspective view of an outer shroud for the centrifuge of FIG. 15.

As shown in FIGS. 16 and 23, in an embodiment, a shroud 417 may be present on the outside of the body 402 to receive a fluid component of stage three feed from the fluid discharge outlet 422. The shroud 417 does not rotate with the body 402, facilitating connection of the shroud 417 to a removal assembly (not shown) to remove the fluid component 602 (FIG. 19). A similar shroud may be attached at the solid discharge end 406 (not shown), for connection to a removal assembly (not shown) to remove the solid component 600 (FIG. 19).

One or more feed pipes provide flowable material to the body 402. In the illustrated embodiment, a first feed pipe 424 and a second feed pipe 426 are in the drive shaft 414. The first feed pipe 424 is in fluid communication with the body 402 proximate the fluid discharge end 404. The second feed pipe 426 is in fluid communication with the body 402 proximate the solids discharge end 406. A first feed may be delivered through the first feed pipe 424 and a second feed may be delivered through the second feed pipe 426. The drive shaft 414 includes feed apertures 433, 435 to allow the first and second feeds to enter the body 402. In an embodiment, the first and second feed pipes 424, 426 may be respectively mounted in bearings 428, 430 in the drive shaft 414 to allow the first and second feed pipes 424, 426 to rotate independently of the drive shaft 414.

In an embodiment, the first feed pipe 424 is in fluid communication with the body 402 about a third of the way along the longitudinal axis from the fluid discharge end 404. The second feed pipe 426 is in fluid communication with the body 402 about a third of the way along the longitudinal axis from the solids discharge end 406.

In an embodiment, a braking system 434 is provided to slow rotational speed of the drive shaft 414. For example, the braking system may be a brake disc 436 and a brake 438. Alternatively, the braking system 434 may be a gear assembly (not shown), or any other appropriate braking system 434 may be employed. Without application of the braking system 434, the rake assembly 412 will rotate at a similar velocity to the body 402. With application of the braking system 434, the drive shaft 414 will rotate at a lower velocity than the body 402, resulting in a differential rotation between the drive shaft 414 and the body 403. For example, the rake assembly 412 may rotate at a differential speed that is 1-2 m/s slower than the body 402.

In an embodiment, the body 402 may be about 1.5 meters in diameter and about 10 meters long. The illustrated drive wheels 408 and support wheels 410 in FIGS. 15 to 18 are elongated to facilitate supporting of the body 402. Alternatively, a series of wheels that are not elongated, for example truck tires, may be used in series to support the body 402, for example, being distributed about every 1.5 meters along the length of the body 402 (not shown). In an embodiment, rotating the body 402 at about 30 m/s may generate centripetal force of about 120 times the force of gravity. In other embodiments, rotating the body 402 may generate centripetal force of between 70 and 170 times the force of gravity.

In an embodiment, the drive wheels 408 may be powered by a drive shaft and a variable speed motor (not shown). The motor may, for example, be an electric motor.

In an embodiment, the support wheels 410 may be connected to a steel frame that is secured to a foundation of a building (not shown).

In an embodiment, the stage three centrifuge 400 may be open to the atmosphere. In an embodiment, means may be included to recover gas that may evolve from within the body 402. In an embodiment, a VRU may be included to recover the $CO_2$ and prevent its release into the atmosphere (not shown).

In an embodiment, cross-bracing (not shown) may be present between the connectors 416 to provide lateral support to the connectors 416. For example, the cross-bracing could be substantially perpendicular to two connectors 416 and extend between the two connectors 416.

FIG. 20 is detail view of an embodiment of the rake 432 defining a cavity 440 on the surface of the rake 432 facing the inner surface of the body 402. In operation, fines may concentrate in the cavity 440. Without being bound by theory, Bernoulli effects may urge the fines to the flow into the cavity 440, and fines may align with this flow, facilitating aggregation of fines and $CaCO_3$. In an embodiment, the rake 432 includes flanges 442 for drawing fluid under the flanges 442, which may facilitate hydroplaning of the rake 432 across the body 402 during differential rotation of the rake assembly 412 relative to the body 402.

Operation of Stage Three Centrifuge

FIG. 19 shows the stage three centrifuge 500 in operation. Stage three feed is added to the stage three centrifuge 500. The stage three feed includes a fluid component 600 and a solid component 602. In some embodiments, the stage three feed includes stage one lower flow stream 108, stage two lower flow stream 304, or both. Without being bound by theory, the higher pH of the stage two lower flow stream 304 may cause precipitation of $CaCO_3$ from the stage one lower flow stream 108 when the lower flow streams 108, 304 mix.

Rotation of the body 402 directs the solid component 600 to the inner surface of the body 402 by centripetal force. During rotation of the body 402, fluids within the body 402 will be located between the rake 432 and the inner surface of the body 402. Where the drive shaft is not engaged, rotation of the body 402 with fluid inside the separation zone 403 results in rotation of the rake assembly 412 at a similar speed. Braking or acceleration applied to the drive shaft 414 will result in differential rotation of the rake assembly 412 relative to the body 402 (e.g. the rake assembly 412 may be rotated at a slower rotational velocity than the body 402 by applying braking to the drive shaft 414 or at a greater rotational velocity than the body 402 by applying acceleration to the drive shaft 414).

Differential rotation of the rake assembly 412 relative to the body 402 directs the solid component 600 to the solid discharge end 402 where recovered solids 606 are directed out of the solids discharge outlet 420. As the solid component 600 is pushed up the slope 420 to the solid discharge end 402, the solid component 600 is raised above the fluid level 604 and further fluid component 602 is separated from the solid component 600. The recovered solids 606 may for example be stackable dry tailings. The mechanical action of the rake 432 facilitates aggregation of the solid component 600. Similarly, differential rotation of the rake assembly 412 relative to the body 402 directs the fluid component 602 to the fluid discharge end 404 where recovered fluid 608 flows through the fluid outlet 422. The recovered fluids 608 may for example include process water.

Rotation of the rake assembly 412 may also centralize the rake 432 and support the body 402 from within the separation zone 403. Without being bound by theory, the relative velocity of rake 432 to the body 402, a few millimeters away, may generate a high-pressure condition in the space between the rake 432 and the body 402. The differential pressure will push out on the rake 432, centralizing the rake assembly 412 in the body 402, drawing fluid under the rake 432, and supporting the body 402 from within the separation zone 403. In an embodiment, the rake 432 may extend along the body 402 to provide evenly distributed support around the circumference of the inner surface of the body 402 (e.g. where the rake follows a helical path).

In an embodiment, cationic polymers (shown in FIGS. 1 and 2) may be added to the stage two lower flow stream 304 to further precipitate ooids 300 closer to the fluid discharge end 404.

Stage Three Centrifuge with Support Plates

Figure 22:
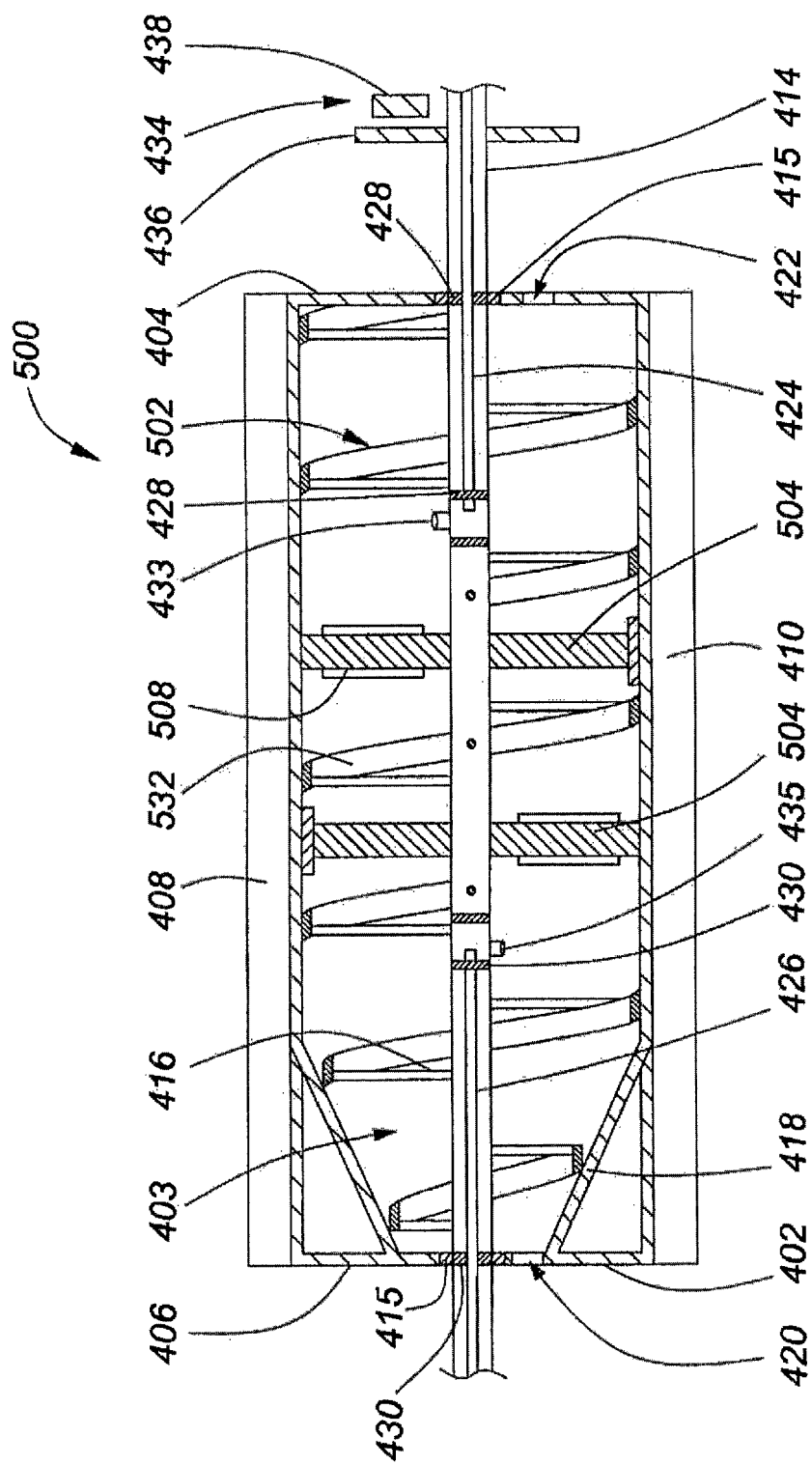
FIG. 22 is a cross-sectional elevation view of the centrifuge of FIG. 21 along a plane analogous to the plane 17-17 of FIG. 15 showing the rake assembly and drive shaft in cross section.

FIGS. 21 and 22 show a stage three centrifuge 500. The stage three centrifuge 500 includes features common to the stage three centrifuge 400. In addition to the features common to the stage three centrifuge 400, the rake 532 of the rake assembly 502 is discontinuous and support plates 504 are positioned along the rake assembly 502 for further supporting the elongate body 402 from within. The support plates 504 include one or more apertures 506 to provide fluids communication across the plates 504. In an embodiment, the level of the apertures 506 may be further from the body 402 closer to the feed apertures 433, 435 compared to the level of the apertures 506 closer to the solids discharge outlet 420 and fluid discharge outlet 422.

In an embodiment, skis 508 extend from the support plates 504. The skis 508 do not contact the inner surface of the body 402. During operation, the skis 508 may hydroplane on fluid in the body 402 a few millimeters from the inner surface of the body 402, mitigating abrasive damage to the inner surface of the body 402 by the blades 416 and centralizing the support plates 504 similarly to the centralizing action of the rake assembly 502. Alternatively, the support plates 504 and the skis 508 can be sized and positioned such that the skis 508 skim across the surface of the fluids at the fluid level 604 during operation (not shown).

In an embodiment, the skis 508 may each define a cavity similarly to the cavity 440 of the rake 432. As with the cavity 440, in operation, fines may concentrate in the cavities of the skis 508. Without being bound by theory, Bernoulli effects may urge the fines to the flow into the cavities of the skis 580, and fines may align with this flow, facilitating aggregation of fines and $CaCO_3$. In an embodiment, the skis 508 may include flanges similar to the flanges 442 of the rake 432 for facilitating hydroplaning on the body 402.

The skis 508 may mitigate load on bearings 415 and reduce vibrations. Without being bound by theory, the relative velocity of the skis 508 to the body 402, a few millimeters away, may generate a high-pressure condition in the space between the skis 508 and the body 402. The differential pressure will push out on the skis 508, centralizing the rake assembly 502 in the body 402, drawing fluid from the under the ski 508, and supporting the body 402 from within the separation zone 403. In an embodiment, three skis 508 are on each of the support plates 504 to provide uniform support about a circumference of the rake assembly 502. Other even spaced distributions of the skis 508 may also result in uniform support.

Examples Only

In the preceding description, for purposes of explanation, numerous details are set forth in order to provide a thorough understanding of the embodiments. However, it will be apparent to one skilled in the art that these specific details are not required.

The above-described embodiments are intended to be examples only. Alterations, modifications and variations can be effected to the particular embodiments by those of skill in the art without departing from the scope, which is defined solely by the claims appended hereto.

REFERENCES

R. J Mikula, V. A Munoz, O. Omotoso, Centrifuge options for production of "Dry stackable tailings" in surface mined oil sands tailing management, Canadian Petroleum Society, 2008.
Definitions of Clay Crystals, Juma, N. The Pedosphere and its Dynamics; Mineralogy, 6.3 Clay Crystals, 1998.
P. Mercier, Y. Page, Y. Tu, L. Kotlyar, Powder, X-Ray Diffraction of Phyllosilcate Mass and Area verse Particle Thickness Distributions for Clays from Athabasca Oil Sands, NRC, 2008.
Subsurface mineralization, Rate of $CO_2$ mineralization and geo-mechanical effects on host and seal formations, S. Hangx, 2005, CATO work package.
Centrifuge Tailing from Oil Sands Plant, A resource Material for Titanium and Zirconium, A. Majid, F. Toll, B Sparks, 1998, National Research council.
Electrical Conductivity of Na/Ca Montmorillonite Gels, I, Shainberg, J. D. Oster, J. D. Wood, 1982, The Clay mineral Society.
Laurent, J Michot, I Bihannic, S. Maddl., Liquid-crystalline aqueous clay suspensions, PHAS, 2006.

The invention claimed is:

1. A centrifuge for separating a suspension into a fluid component and a solids component, the centrifuge comprising:
    an elongate body extending along a substantially horizontal longitudinal axis between a fluid discharge end and a solids discharge end, the body rotatable about the longitudinal axis;
    a separation zone defined within the body;
    a rotation driver that rotates the body about the longitudinal axis, the rotation driver rotatably engaging the body between the fluid discharge end and the solids discharge end thereof;
    a drive shaft extending through the body and rotatable about the longitudinal axis independently of the body;
    a rake connected to the drive shaft and positioned proximate an inner surface of the body such that the rake is stabilized and centralized in the body during differential rotation of the rake relative to the body in the presence of a fluid;
    a first inlet for receiving the suspension into the separation zone;
    a fluid discharge outlet for discharging fluid proximate the fluid discharge; and
    a solids discharge outlet for discharging solids proximate the solids discharge end;
    wherein rotation of the body with the suspension in the separation zone causes rotation of the rake and drive shaft; and
    the differential rotation of the rake relative to the body directs solids to the solid discharge end.

2. The centrifuge of claim 1 wherein the rake is helical and extends along substantially the entire length of the body along the longitudinal axis.

3. The centrifuge of claim 1 further comprising a brake for slowing rotation of the drive shaft independently of the body to provide differential rotation of the rake and the body.

4. The centrifuge of claim 1 wherein the first inlet is located within the drive shaft.

5. The centrifuge of claim 1 wherein the rake defines a cavity on an outer surface of the rake facing the inner surface of the body for pooling of the suspension during rotation of the drive shaft.

6. The centrifuge of claim 5 further comprising flanges extending laterally from each side of the cavity to facilitate rotation of the rake and the drive shaft by rotation of the body with the suspension in the separation zone and to facilitate hydroplaning over the inner surface of the body during differential rotation.

7. The centrifuge of claim 1 wherein the rotation driver comprises a support wheel positioned about an outer surface of the body for supporting the body during rotation of the body and a drive wheel positioned about the outer surface for driving rotation of the body about the longitudinal axis.

8. The centrifuge of claim 1 wherein the fluid discharge outlet is on the fluid discharge end.

9. The centrifuge of claim 1 wherein the solids discharge outlet is on the solids discharge end.

10. The centrifuge of claim 1 wherein the rotation driver is positioned about an outer surface of the body.

11. The centrifuge of claim 1 wherein centralizing the rake in the body during differential rotation of the rake relative to the body in the presence of a fluid comprises generating a high-pressure condition in the space between the rake and the body.

12. The centrifuge of claim 1 wherein centralizing in the body during differential rotation of the rake relative to the body in the presence of a fluid comprises hydroplaning the rake over the inner surface of the body.

13. The centrifuge of claim 7 further comprising a plurality of support wheels about the outer surface for driving rotation of the body about the longitudinal axis.

14. The centrifuge of claim 7 further comprising a plurality of drive wheels about the outer surface for driving rotation of the body about the longitudinal axis.

15. A centrifuge for separating a suspension into a fluid component and a solids component, the centrifuge comprising:
- an elongate body extending along a substantially horizontal longitudinal axis between a fluid discharge end and a solids discharge end, the body rotatable about the longitudinal axis;
- a separation zone defined within the body;
- a rotation driver for rotating the body about the longitudinal axis;
- a drive shaft extending through the body and rotatable about the longitudinal axis independently of the body;
- a rake connected to the drive shaft and positioned proximate an inner surface of the body such that the rake is stabilized and centralized in the body during differential rotation of the rake relative to the body in the presence of a fluid;
- a first inlet for receiving the suspension into the separation zone, wherein the first inlet is located within the drive shaft;
- a second inlet within the drive shaft for delivering fluid to the separation zone, the first and second inlets delivering feed at different longitudinal locations along the separation zone;
- a fluid discharge outlet for discharging fluid proximate the fluid discharge; and
- a solids discharge outlet for discharging solids proximate the solids discharge end;
- wherein rotation of the body with the suspension in the separation zone causes rotation of the rake and drive shaft; and
- the differential rotation of the rake relative to the body directs solids to the solid discharge end.

16. A centrifuge for separating a suspension into a fluid component and a solids component, the centrifuge comprising:
- an elongate body extending along a substantially horizontal longitudinal axis between a fluid discharge end and a solids discharge end, the body rotatable about the longitudinal axis;
- a separation zone defined within the body;
- a rotation driver for rotating the body about the longitudinal axis;
- a drive shaft extending through the body and rotatable about the longitudinal axis independently of the body;
- a support plate mounted on the drive shaft for supporting the body, the support plate including a plurality of apertures for allowing fluid to pass through the support plate;
- a rake connected to the drive shaft and positioned proximate an inner surface of the body such that the rake is stabilized and centralized in the body during differential rotation of the rake relative to the body in the presence of a fluid;
- a first inlet for receiving the suspension into the separation zone, wherein the first inlet is located within the drive shaft;
- a fluid discharge outlet for discharging fluid proximate the fluid discharge; and
- a solids discharge outlet for discharging solids proximate the solids discharge end;
- wherein rotation of the body with the suspension in the separation zone causes rotation of the rake and drive shaft; and
- the differential rotation of the rake relative to the body directs solids to the solid discharge end.

17. A centrifuge for separating a suspension into a fluid component and a solids component, the centrifuge comprising:
- an elongate body extending along a substantially horizontal longitudinal axis between a fluid discharge end and a solids discharge end, the body rotatable about the longitudinal axis;
- a separation zone defined within the body,
- a rotation driver for rotating the body about the longitudinal axis;
- a drive shaft extending through the body and rotatable about the longitudinal axis independently of the body;
- a rake connected to the drive shaft and positioned proximate an inner surface of the body, wherein connectors connect the rake to the drive shaft, wherein the rake has a width that is wider than the connectors, and wherein the rake is positioned sufficiently proximate the inner surface to be stabilized and centralized therein by a high-pressure condition in a space between the rake and the body caused by differential rotation of the rake relative to the body and the width of the rake;
- a first inlet for receiving the suspension into the separation zone;
- a fluid discharge outlet for discharging fluid proximate the fluid discharge; and
- a solids discharge outlet for discharging solids proximate the solids discharge end;
- wherein rotation of the body with the suspension in the separation zone causes rotation of the rake and drive shaft; and
- the differential rotation of the rake relative to the body directs solids to the solid discharge end.

18. The centrifuge of claim 17, wherein the rake is prevented from contacting the inner surface of the body by a fluid within the space therebetween during the differential rotation.

19. The centrifuge of claim 17 further comprising a brake for slowing rotation of the drive shaft independently of the body to provide differential rotation of the rake and the body.

20. The centrifuge of claim 17 wherein the rake defines a cavity on an outer surface of the rake facing the inner surface of the body for pooling of the suspension during rotation of the drive shaft.

21. The centrifuge of claim 20 further comprising flanges extending laterally from the each side of the cavity to facilitate rotation of the rake and the drive shaft by rotation of the body with the suspension in the separation zone and to facilitate hydroplaning over the inner surface of the body during differential rotation.

22. The centrifuge of claim 17 wherein the rotation driver comprises a support wheel positioned about an outer surface of the body for supporting the body during rotation of the body and a drive wheel positioned about the outer surface for driving rotation of the body about the longitudinal axis.

23. The centrifuge of claim 22 further comprising a plurality of support wheels about the outer surface for driving rotation of the body about the longitudinal axis.

24. The centrifuge of claim 22 further comprising a plurality of drive wheels about the outer surface for driving rotation of the body about the longitudinal axis.

25. The centrifuge of claim 17 wherein the rotation driver rotatably engages an outer surface of the body between the fluid discharge end and the solids discharge end.

* * * * *